United States Patent
Mori et al.

(10) Patent No.: US 6,757,593 B2
(45) Date of Patent: Jun. 29, 2004

(54) VEHICLE EXPRESSION OPERATION CONTROL SYSTEM, VEHICLE COMMUNICATION SYSTEM, AND VEHICLE WHICH PERFORMS EXPRESSION OPERATION

(75) Inventors: Kenji Mori, Toyota (JP); Naoto Kitagawa, Toyota (JP); Akihiro Inukai, Toyota (JP); Simon Humphries, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 10/098,371

(22) Filed: Mar. 18, 2002

(65) Prior Publication Data

US 2002/0138181 A1 Sep. 26, 2002

(30) Foreign Application Priority Data

Mar. 22, 2001 (JP) ........................................ 2001-083909

(51) Int. Cl.⁷ ............................ G05D 1/00; G06F 19/00; G06F 7/00
(52) U.S. Cl. ............................ 701/1; 700/31; 700/19; 700/245; 706/48
(58) Field of Search ...................... 701/1, 49; 315/291, 315/299; 700/31, 245, 1, 19, 259; 706/15, 62, 11, 46–48; 382/106; 341/20

(56) References Cited

U.S. PATENT DOCUMENTS 5,182,557 A * 1/1993 Lang ............................ 341/20

6,175,772 B1 * 1/2001 Kamiya et al. ................ 700/31
6,480,616 B1 * 11/2002 Hata et al. .................... 382/106
2002/0045978 A1 * 4/2002 Nishimura et al. ........... 701/49
2002/0063297 A1 * 5/2002 Lee .............................. 257/371
2003/0057887 A1 * 3/2003 Dowling et al. ............. 315/291
2003/0074337 A1 * 4/2003 Sadakuni ..................... 706/11

FOREIGN PATENT DOCUMENTS

| JP | A 10-157514 | 6/1998 |
| JP | A 10-289006 | 10/1998 |
| JP | A 2000-186942 | 7/2000 |

* cited by examiner

Primary Examiner—Thomas G. Black
Assistant Examiner—Ronnie Mancho
(74) Attorney, Agent, or Firm—Oliff & Berridge, PLC

(57) ABSTRACT

A vehicle expression operation control system and vehicle communication system for performing an expression operation to generate an easily understood expression and a vehicle for performing an expression operation. Condition and other information about a vehicle is detected by an operation information collecting section (12) and detected data collection section (14), and supplied to a reaction formulating section (26). Based on current status information of the vehicle held in a state recognizing section (24), the reaction formulating section (26) formulates a reaction and controls performance of an expression operation corresponding to the formulated reaction. Further, based on the reaction formulated, an operation control section (28) controls operation of respective devices equipped to the vehicle, including lights, antennae, and the like, so that the vehicle performs such expression operation.

20 Claims, 22 Drawing Sheets

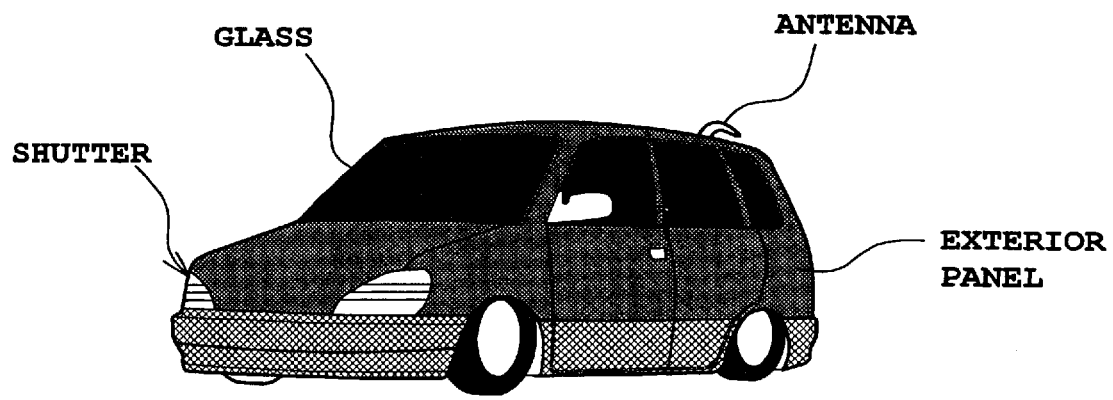
Fig.1A
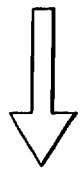
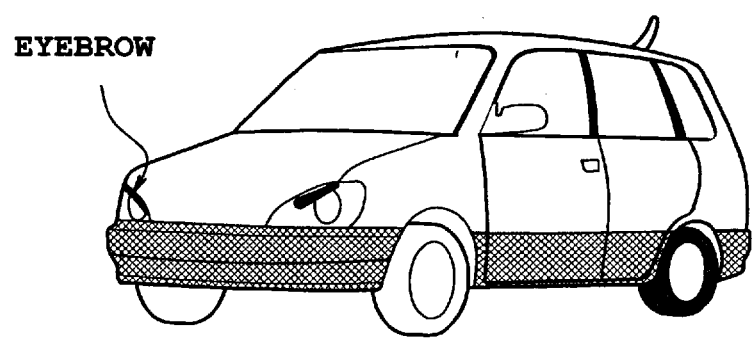
Fig.1B

| REACTION | | STATUS | VEHICLE CONDITION | EXPRESSION OPERATION | | | | | |
|---|---|---|---|---|---|---|---|---|---|
| | | | | ORNAMENT LINE | MOLE | HEAD LIGHT | ANTENNA | VEHICLE HEIGHT POSITION | |
| ANGER | IRRITATED | PHASE 1 | RECKLESS CUTTING-IN PROTEST AGAINST VEHICLE INFRINGING RULES | CHANGE TO RED | EYEBROW LIT (ANGRY) | — | STD | STD | |
| | ANGER | PHASE 3 | DANGEROUS CUTTING-IN PROTEST AGAINST PASSING | CHANGE TO DARKER RED | EYEBROW LIT (ANGRY) | SHADED (ANGRY) | STD | FRONT LOWERED | |
| SAD | SAD | PHASE 1 | CONGESTED TRAFFIC GAS RUNNING LOW DUE TO IDLING MALFUNCTION SUCH AS LAMP OUT | CHANGE TO BLUE | EYEBROW LIT | — | STD | STD | |
| | CRYING | PHASE 2 | NOT PASSABLE BECAUSE BLOCKED FLAT TIRE, DEAD BATTERY, GAS VERY LOW, BREAKDOWN | CHANGE TO DARKER BLUER | EYEBROW LIT, TEAR BLINK | SHADED | STD | STD | |
| TIRED | SLEEPY | PHASE 1 | IMMEDIATELY AFTER ENGINE-OFF RETURN HOME | STD | EYEBROW LIT (SLEEPY) GREEN | SHADED (SLEEPY) | STD | STD | |
| | SLEEPING | PHASE 2 | FEW MINUTES AFTER ENGINE-OFF | STD | STD | SHADED (SHUT) | DOWN | VEHICLE LOWERED | |
| JOYFUL | HAPPY | PHASE 1 | FUN TO DRIVE DRIVING SKILL IMPROVED | CHANGE TO ORANGE | EYEBROW LIT IN ORANGE (JOYFYL) | STD | UP | STD | |
| | DELIGHTED | PHASE 2 | DRIVER APPROACHING | CHANGE TO ORANGE | EYEBROW LIT IN ORANGE (JOYFYL) | STD | UP RIGHT AND LEFT | VEHICLE RAISED | |
| | WINKING | | LET OTHER GO FIRST | CHANGE TO ORANGE | EYEBROW LIT IN ORANGE (JOYFYL) | SHADED (WINKING) | VIBRATE RIGHT AND LEFT | STD | |
| THINKING | LOOKING AROUND | | LOOKING FOR A PLACE INQUIRY TO OTHER VEHICLE (WHAT CAUSES CONGESTION?) | STD | EYEBROW LIT IN ORANGE | SHADED (THINKING) | STD | STD | |
| CAREFUL | SUSPICIOUS CAREFUL | | CANNOT PREDICT OTHER'S MOVEMENT POOR VISIBILITY CAREFUL DRIVING AT CROSSING | STD | EYEBROW LIT IN RED | SHADED (SUSPICIOUS) | STD | STD | |
| SURPRISE | SURPRISE | | SUDDEN APPEARANCE OF VEHICLE OR PEDESTRIAN SUDDEN BREAKING | ORANGE | EYEBROW LIT IN RED | SHADED (SURPRISED) | STD | REAR LOWERED | |
| SHAMED | APOLOGY (SORRY) | | DISTURBING OTHERS SURPRISED OTHERS | RED | EYEBROW LIT IN RED | SHADED (SHAMED) | STD | STD | |
| VIGOROUS | FINE | | IMMEDIATELY AFTER FUELING BEFORE LONG DISTANCE DRIVE GO FIRST AT CROSSING | STD | EYEBROW LIT IN ORANGE | SHADED (VIGOROUS) | UP | STD | |

Fig. 6

VEHICLE EXPRESSION OPERATION CONTROL SYSTEM, VEHICLE COMMUNICATION SYSTEM, AND VEHICLE WHICH PERFORMS EXPRESSION OPERATION

1. FIELD OF THE INVENTION

The present invention relates to a vehicle and a system associated with a vehicle.

2. DESCRIPTION OF THE RELATED ART

Watching people and animals, one can sense their emotions such as whether they are happy or angry. This is because people and animals can express their feeling by crying, laughing, and so forth, using their mouth, eyes, and so forth, and many expressions of emotion are shared and can be commonly recognized.

Meanwhile, vehicles, such as automobiles and trains, are used as a means of transportation. In fact, their use is growing such that traffic is increasing and becoming heavier. Partly, this congestion is because there is a tendency for people to use vehicles even when they travel to nearby places. Today, on most streets one will see many more vehicles than pedestrians.

Conventionally, many improvements have been made to functions, such as engines and breaks, of vehicles related to their use as a means of transportation. However, there has been almost no improvement related to imparting vehicles with means, beyond essential functions, of expression similar to those found in human being or other animals, with the result that today inorganic vehicles travel up and down the streets. Further, because vehicles have no true expression functions, an occupant's emotion and intent can only be conveyed to people through limited means such as the vehicle's horn and directional lights.

In recent days, however, as traffic grows heavier and vehicle use increases, vehicles having expression functions, such as crying and laughing, like people and other animals do, could create a joyful, organic atmosphere rather than the simple comings and goings of inorganic vehicles. Such emotive, organic vehicles could also lead occupants to have greater affinity f or their vehicles, and make the driving experience more comfortable.

Moreover, because horns are used as the primary means for expressing an occupant's intention, and because the horn sounds nearly the same when sounded, for example, when asking for permission to cut in front and in showing gratitude for having been allowed to cut in front, the person addressed by the horn often has no idea what it is that the occupant wishes to communicate. If, however, various expression functions are provided to vehicles, an occupant can convey his intention more clearly, so that the range of communication with people outside of the vehicle can be expanded.

SUMMARY OF THE INVENTION (1) According to one aspect of the present invention, there is provided vehicle expression operation control system for controlling an expression operation of a vehicle, comprising a vehicle condition detecting device for detecting condition of the vehicle, including a state of operation of the vehicle or a state of operation of a device equipped to the vehicle; and a reaction control device for determining a reaction of the vehicle based on the condition of the vehicle detected by the vehicle condition detecting device to control performance of an expression operation corresponding to the reaction determined.

(2) According to another aspect of the present invention, there is provided vehicle expression operation control system for controlling an expression operation of a vehicle, comprising an occupant condition detecting device for detecting condition of an occupant of the vehicle, including condition of the occupant and a command input by the occupant; and a reaction control device for determining a reaction of the vehicle based on the condition of the occupant of the vehicle detected by the occupant condition detecting device to control performance of an expression operation corresponding to the reaction determined.

(3) According to still another aspect of the present invention, there is provided vehicle expression operation control system for controlling an expression operation of a vehicle, comprising an electronic partner condition detecting device. for detecting condition of an electronic partner or a command input given to the electronic partner by an occupant of the vehicle, the electronic partner being placed in the vehicle by the occupant and performing a predetermined motion based on its function for expressing a reaction according to detected external conditions or in response to a command input; and a reaction control device for determining a reaction of the vehicle based on the condition of the electronic partner detected by the electronic partner condition detecting device to control performance of an expression operation corresponding to the reaction determined.

(4) According to yet another aspect of the present invention, there is provided vehicle expression operation control system for formulating a reaction of a vehicle and controlling performance of an expression operation corresponding to the reaction formulated, comprising: current status recognition means for recognizing current status of a state, including a reaction, of the vehicle; vehicle condition detecting means for detecting condition of the vehicle, including a state of operation of the vehicle or a state of operation of a device equipped to the vehicle; reaction formulating means for formulating a reaction based on the current status of the vehicle recognized by the current status recognition means and according to the condition of the vehicle detected by the vehicle condition detecting means; and reaction control means for controlling performance of an expression operation corresponding to the reaction formulated by the reaction formulating means.

(5) According to yet another aspect of the present invention, there is provided vehicle expression operation control system for formulating a reaction of a vehicle and controlling performance of an expression operation corresponding to the reaction formulated, comprising current status recognition means for recognizing current status of a state, including a reaction, of the vehicle; occupant condition detecting means for detecting condition of an occupant of the vehicle, including condition of the occupant and a command input by the occupant; reaction formulating means for formulating a reaction based on the current status of the vehicle recognized by the current status recognition means and according to the condition of the occupant detected by the occupant condition detecting means; and reaction control means for controlling performance of an expression operation corresponding to the reaction formulated by the reaction formulating means.

(6) The vehicle expression operation control system according to the above (4) may further comprises occupant condition detecting means for detecting condition of an occupant of the vehicle, including condition of the occupant and a command input by the occupant. In the above system, the reaction formulating means may formulate a reaction based on the current status of the vehicle recognized by the current status recognition means and according to the condition of the occupant detected by the occupant condition detecting means.

(7) According to yet another aspect of the present invention, there is provided a vehicle communication system comprising the vehicle expression operation control system according to the above (4) and an electronic partner placed in the vehicle by an occupant of the vehicle, for performing a predetermined motion based on its function for expressing a reaction according to a state of outside situation or in response to a command input. In this system, the vehicle expression operation control system and the electronic partner are able to transmit and receive data between each other.

(8) In the above vehicle communication system, the electronic partner may obtain information on the reaction of the vehicle from the vehicle expression operation control system and performs a predetermined motion based on the information obtained (9) Further, in the above vehicle communication system, the reaction of the electronic partner may be identical to the reaction of the vehicle.

(10) Still further, in the above vehicle communication system, the vehicle expression operation control system may obtain a command input to the electronic partner or information concerning an outside situation; and the reaction formulating means of the vehicle expression operation control system may formulate a reaction of the vehicle based on the command input to the electronic partner or the information concerning an outside situation.

(11) Yet further, in the above vehicle communication system, the vehicle expression operation control system may obtain information on the reaction of the electronic partner; and the reaction formulating means of the vehicle expression operation control system may formulate the reaction of the vehicle based on the reaction of the electronic partner.

(12) Yet further, the above vehicle expression operation control system or vehicle communication system may further comprise an output device installed in the vehicle, for outputting information on the reaction or expression operation of the vehicle.

(13) According to yet another aspect of the present invention, there is provided a vehicle for performing an expression operation by changing an external appearance of devices equipped to the vehicle.

(14) The above vehicle may further comprise an expression operation assisting member for assisting an expression operation of the devices equipped to the vehicle.

BRIEF DESCRIPTION OF THE DRAWINGS

FIG. 1 is a diagram showing a vehicle incorporating the present invention;

FIG. 6 is a diagram showing an example reaction and corresponding expression operation;

PREFERRED EMBODIMENTS OF THE PRESENT INVENTION

Figure 2:
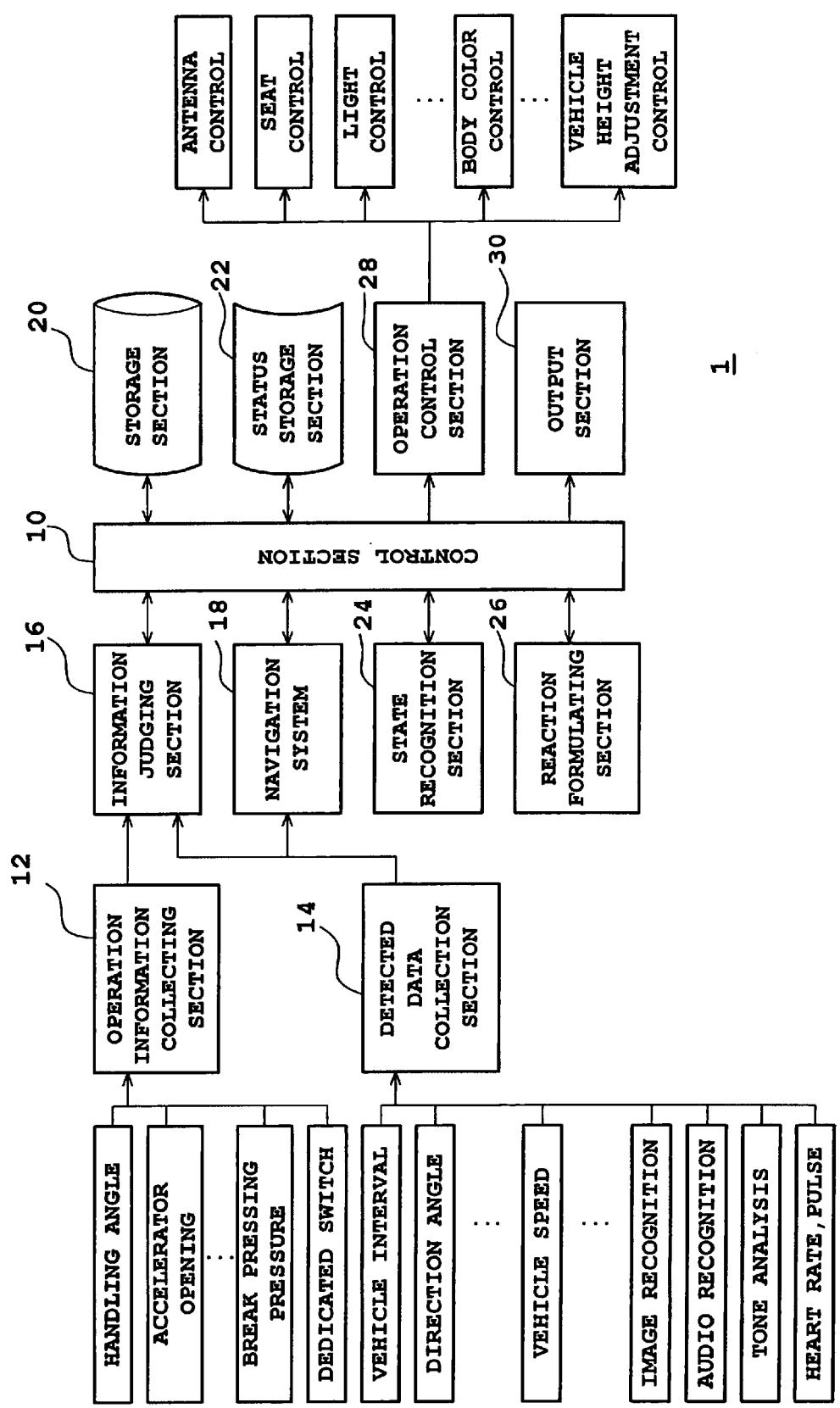
FIG. 2 is a diagram showing a structure of devices constituting a vehicle expression operation control system according to a first embodiment of the present invention.

In the following, preferred embodiments of the present invention (hereinafter referred to as embodiments) will be described with reference to the drawings. In the drawings, identical members are given identical reference numerals and their descriptions are not repeated.

Outline of the Embodiments

Vehicles in the following embodiments, devices equipped to vehicles are anthropomorphized and their appearance is changed whereby various expression operations are performed in an easily understandable manner. Such vehicles are not limited to automobiles and the present invention can be desirably applied also to motorcycles, ships, aircraft, and so forth.

FIG. 1 is a diagram showing an image of a vehicle which uses the present invention. This vehicle, the same vehicle is shown in both FIG. 1A and FIG. 1B, is equipped with headlight shutters and a movable antenna. The windshield of this vehicle is made of material whose light transmittance can be varied by application of a voltage or other means, and the exterior panels are made of a material which can change color, such as due to heat.

In FIG. 1, the headlights, antenna, and windshield and exterior panels can be regarded as the vehicle's eyes, tail, and a body surface, respectively. The vehicle in FIG. 1A expresses a state of "sleeping", while that of FIG. 1B expresses a state of "awake". More specifically, in vehicle in FIG 1A, the shutters, or eyes, are closed, the antenna is limp, the glass and exterior panel are a darker color, and the vehicle height is lowered. Together, these express a "sleeping" state. The vehicle in FIG. 1B, on the other hand, has open shutters, headlights fringed with complementary "eyebrows", an erect antenna, and brighter glass and exterior panels, thereby expressing "awake".

These automobiles, as example vehicles which perform an expression operation, can be realized using a vehicle expression operation control system or a vehicle communication system described below.

Specifically, these systems in this embodiment control various vehicle operations to create an expression (an expression operation) based on various situations associated with the vehicle including the vehicle's condition and so forth.

In the following description, an automobile will be described as an example of a vehicle of the present invention.

Embodiment 1

System Structure

FIG. 2 is a diagram showing a structure of devices constituting a vehicle expression operation control system according to a first embodiment of the present invention. A vehicle expression operation control system 1 in this embodiment controls a vehicle so as to formulate its reactions based on the situation and condition (state) of the vehicle to enable an expression operation corresponding to the formulated reaction.

To perform an "expression operation corresponding to the formulated reaction" refers to a process in which a vehicle formulates a certain reaction according to the situation and condition of the vehicle at a particular time and then operates devices equipped to the vehicle based on the formulated reaction so as to communicate the reaction to the outside world. The reaction may include emotions (angry, happy, etc.), conditions (fine, sick, etc.), states (sleeping, waiting, etc.), and so forth.

The expression control system 1 has a control section 10 responsible for various processing and overall control, which generally comprises a CPU, a ROM, a RAM, and so forth, and performs digital data processing. Specifically, the control section 10 reads out an operation program and so forth and executes the system of this embodiment.

An operation information collecting section 12 is connected to a vehicle's various devices and receives detected signals concerning their state of operation. For example, a steering wheel angle, an accelerator opening, a break pressing pressure, and so forth, are detected and such information is supplied to the operation information collecting section 12. The operation information collecting section 12 is further connected to a dedicated switch via which occupants, including the driver and passengers, may input commands to the system so that the occupant's input can be provided to the system.

A detected data collection section 14 is connected to various sensors and receives from them detected signals concerning the condition of the vehicle. The sensors may include a vehicle interval sensor, an angle sensor, a vehicle speed sensor, a temperature sensor, and so forth, and may detect a vehicle interval, a direction angle, a vehicle speed, and so forth. The detection results are supplied in the form of digital data. Further, the detected data collection section 14 collects information concerning the state of operation of an outside camera, audio equipment, air conditioner, and so forth. The detected data collection section 14 is further connected to an image recognizing device, an audio recognition device, and an occupant's heart rate and pulse detecting device to collect information concerning the occupant's condition. The information, or the results of detection, is supplied in the form of digital data.

An information judging section 16 receives information concerning the condition of the vehicle's devices from the operation information collecting section 12 and information concerning vehicle's and occupants' condition from the detected data collection section 14. The information judging section 16 disregards data equal to or less than a predetermined threshold value and supplies various effective data to the control section 10.

A navigation system 18 obtains various data, such as vehicle speed data, from the detected data collection section 14 and supplies information concerning the vehicle's location, map, the shape of a road, and so forth, to the control section 10.

A storage section 20 stores various data necessary for the vehicle expression operation control system. Specifically, reaction data, data history, and so forth, may be stored, the data history being data concerning time, content, and so forth, of expression operations which the vehicle previously performed to communicate specific reactions. An operation program and various data such as results of processes performed by the control section 10 may also be stored in the storage section 20.

A status storage section 22 stores information concerning a current status of a reaction and so forth of the vehicle.

A state recognition section 24 receives information via the control section 10 from the storage section 20, the status storage section 22, and the navigation system 18 and recognizes the current state and so forth of the vehicle. For example, referring to current status information supplied from the status storage section 22, the state recognition section 24 can understand the current status of the reaction which the vehicle is demonstrating.

A reaction formulating section 26 formulates a reaction based on information from the state recognition section 24 and information judging section 16 and determines an expression operation corresponding to the formulated reaction. It should be noted that the reaction formulating section 26 described in the example of this embodiment performs processing corresponding to that of the claimed reaction formulating means and reaction control means.

Suppose that the reaction formulating section 26 receives information from the state recognition section 24 indicating that the vehicle's current reaction is "irritated" and also information from the information judging section 16 indicating that the occupant has just performed sudden operations, such as to react to the sudden cutting in of another vehicle. The reaction formulating section 26 then develops the reaction "irritated" to "angry" and controls the vehicle so as to conduct an expression operation "angry". It should be noted that, in reaction formulation, the reaction formulating section 26 refers also to reaction data and threshold values for reaction formulation, both stored in the storage section 20. Specifically, the reaction formulating section 26 outputs an operation signal to the control section 10 to control so as to perform an expression operation determined based on the formulated reaction.

The results of processing in the reaction formulating section 26 are supplied to the status storage section 22 via the control section 10, and the information stored in the storage section 22 is updated accordingly.

An operation control section 28 controls respective devices equipped to a vehicle. Specifically, based on an expression operation associated with a reaction formulated in the reaction formulating section 26, the operating control section 28 outputs an operation command to the control sections of the vehicle's respective devices to control them. Specifically, the antenna, seats, lights, body color, vehicle height, and so forth, may be controlled by the operation control section 28 such that, for example, the antenna wags, the headlights light, the vehicle is raised, and so forth.

An output section 30 comprises a display and a speaker installed inside the vehicle. Specifically, the output section 30 outputs a vehicle's reaction and associated expression operations by means of video, sound, and so forth, so that the occupants inside of the vehicle can confirm the vehicle reaction and associated expression operation.

Operation of Vehicle Expression Operation System (Reaction Formulation)

Figure 3:
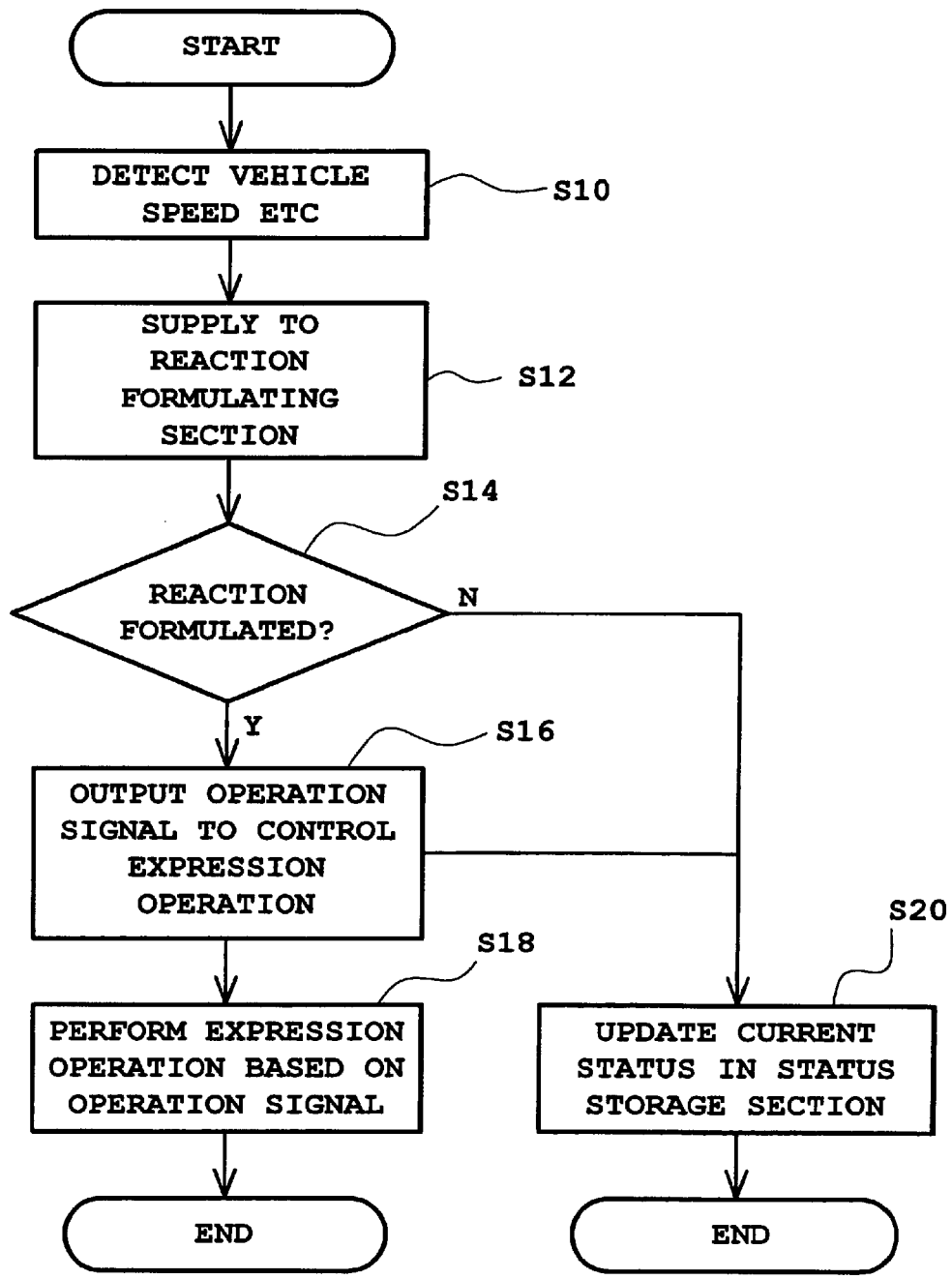
FIG. 3 is a flowchart of an operation of the vehicle expression operation control system shown in FIG. 2.
Figure 4:
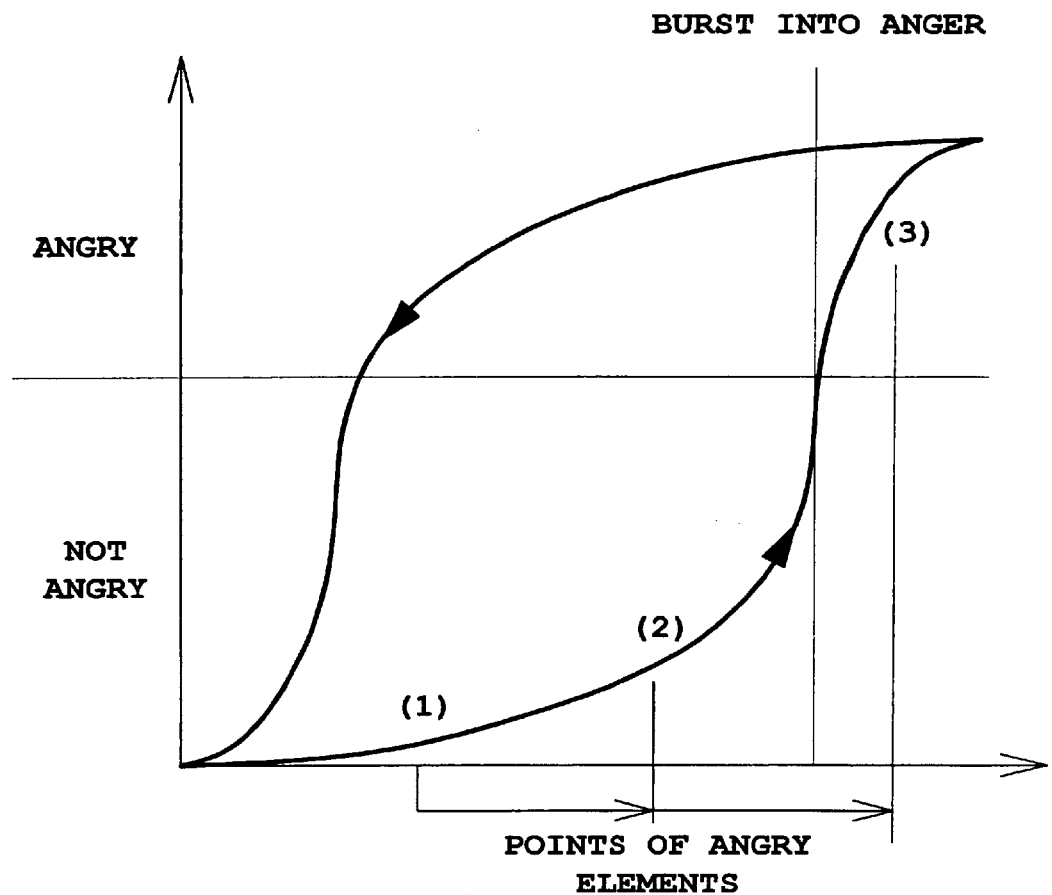
FIG. 4 is a diagram showing a process model of reaction formulation.

FIG. 3 is a flowchart of an operation of the vehicle expression operation control system, and FIG. 4 is a diagram showing a process model of reaction formulation. In the following, formulation of a reaction "angry" and performance of an associated predetermined motion will be described.

When the occupant reacts to reckless cutting in, data on detected vehicle speed and interval are supplied to the detected data collection section 14, and data on a detected handling angle and break pressing pressure are supplied to the operation information collection section 12, both of which then forward the supplied data to the information judging section 16 (S10).

The data are further forwarded to the reaction formulating section 26 via the control section 10 (S12). The reaction forwarding section 26 formulates a reaction with reference to the current vehicle state information held in the state recognition section 24 (S14).

Here, with reference to FIG. 4, reaction formulation will be described. Data from the information judging section 16 is converted into points of, for example, angry elements. In an example wherein the points of "angry" elements are added with the vehicle being in status (1) of its reaction, causing the status (1) to change to status (2), when the number of points associated with the status (2) is less than a threshold value stored in the storage section 20, an "angry" reaction is not yet formulated. Thereafter, when further addition of "angry" points results in causing the status (2) to status (3), such that the number of points exceeds the threshold value, the reaction "angry" is formulated. In another example, a current reaction "joyful" can possibly be changed to "angry" as a result of addition of a number of "angry" points sufficient to bring the total close to the borderline of "angry". A region close to the boundary of "anger" corresponds to "irritating", which can be easily developed into "angry" upon any subtle change in the state of the vehicle. Such status information is stored in the status storage section 22 and recognized by the state recognition section 24.

Returning to FIG. 3, after the formulation of an "angry" reaction as described above, the reaction formulating section 26 outputs an operation signal to the control section 10 to control performance of an expression operation appropriate to the "angry" reaction (S16). The control section 10 forwards the operation signal to the operation control section 28, which in turn outputs an operation command to devices responsible for predetermined operations so that the vehicle performs a concerned expression operation such as, for example, illuminating the headlights (S18). Further, current state information stored in the status storage section 22 is updated accordingly (S20). When the reaction formulating section 26 does not formulate an "angry" reaction at S14, only updating of the status information stored in the status storage section 22 is performed (S20). In this example, specifically, the status (1) is changed to (2), as shown in FIG. 4.

As described above, in this embodiment, a reaction is formulated based on current status information stored in the status storage section 22 and a corresponding vehicle expression operation is carried out based on the formulated reaction. This can prevent a sudden change in the vehicle expression operation, specifically, a vehicle from bursting into anger, then crying, then laughing, and ensures continuity in the expression operation.

The state of "angry" will be changed either over time or in response to soothing input supplied by occupants input through the information judging section 16 because it reduces points of "angry elements". When the number of points is reduced below the threshold value, the vehicle no longer shows "angry". Alternatively, anger may vanish upon detection of input, such as from a switch dedicated to calming anger.

Vehicle Reaction and Expression Operation

Vehicle reaction and expression operations will next be described.

Figure 5:
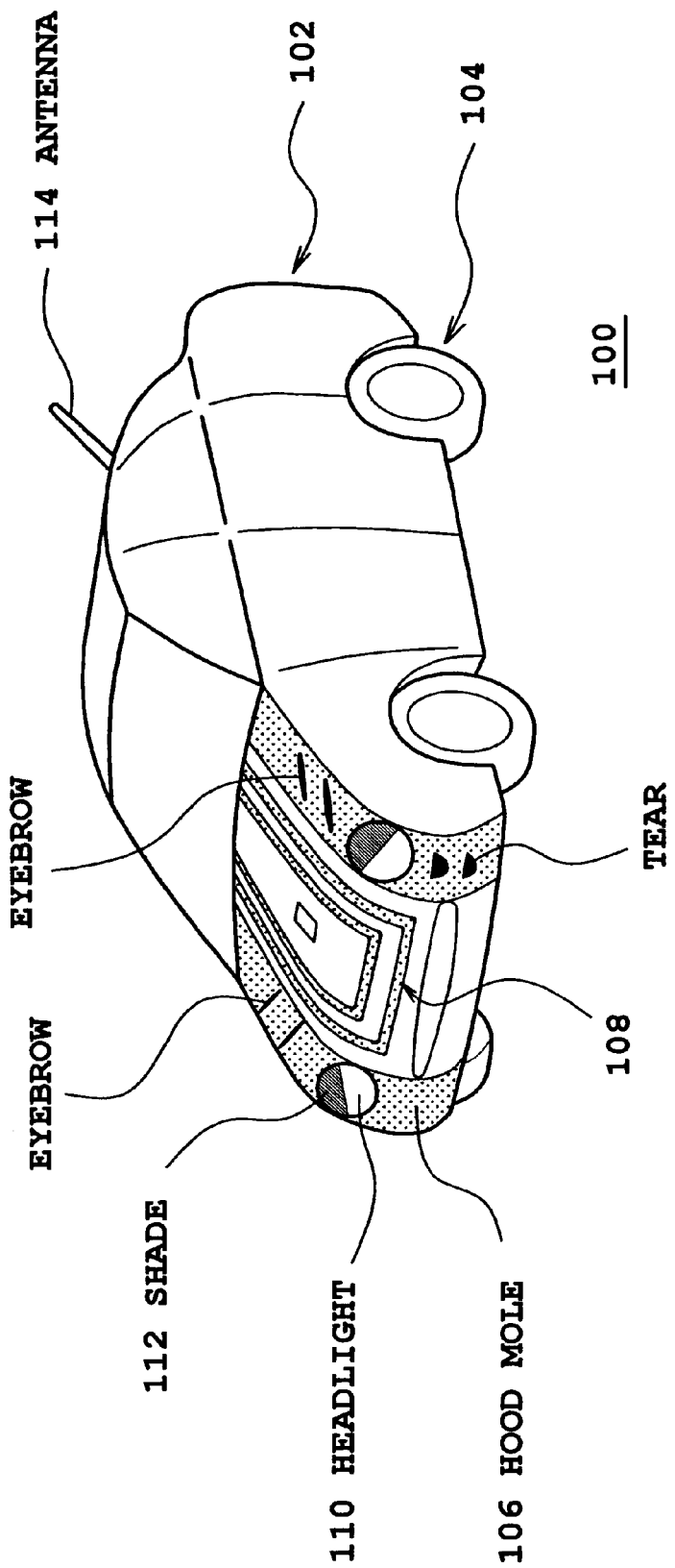
FIG. 5 is a diagram explaining an external appearance of a vehicle performing an expression operation.

FIG. 5 is a diagram explaining external appearance of a vehicle adapted to expression operations according to this embodiment. As shown, the vehicle 100 comprises a body 102 and wheels 104. The body 102 comprises a band-like hood mole (moulding) 106 on each side of the hood of the body 102 and two ornament lines 108 in the region between the hood mole bands on the hood 106. Both the hood mole bands 106 and ornament lines 108 comprise embedded LEDs (light-emitting diodes). Headlights 110 each having a variable shape 112 are installed in the regions of the hood mole bands 106 and an antenna 114 is attached at the rear of the body 102. The ornament lines 108 are supplimentally provided for the purpose of emphasizing and making more easily understandable the expression operations.

These devices are controlled by the operation control section 28. The LEDs of the hood mole band 106 and ornament lines 108 are controlled such that all or some portion of them emit orange, red, blue, or green light according to the expression operation being performed.

The respective devices equipped to the vehicle are anthropomorphized as follows. That is, the headlights 110 represent the eyes; the variable shades 112, which open and close, represent eyelids; and light emission from some LEDs of the hood mole bands 106 represent eyebrows or tear drops. The LEDs of the hood mole bands 106 and ornament lines 108 can create light patterns to make expressions distinguishable for easier understanding. The wheels 104 can be controlled individually so as to adjust the vehicle height to express "waking", "staggering", "sleeping", and so forth. A vibrating antenna 114 represents a tail.

FIG. 6 is a table showing example reactions and corresponding vehicle expression operations. In the table, each reaction ("irritated", "angry", "sad", "crying", and so forth) accompanies description of a relevant state, vehicle condition, and expression operations. "State" in the drawing relates to statuses (1) to (3) in FIG. 4. For example, the state of "irritated" corresponds to Phase 1; and the state of "angry" corresponds to Phase 3. When a vehicle switches from Phase 1 to Phase 3 according to a change in the conditions or situation, "irritated" may proceed to "angry" and an expression operation for "angry" is then performed.

Vehicle expression operations in the table are described in association with major elements of a vehicle. For example, a reaction "irritating" is demonstrated in an operation in which the ornament lines 108 of the vehicle 100 shown in FIG. 5 illuminate red; eyebrows representing "angry" are lit in the hood mole bands 16 (eyebrow expressions will be described later); and the antenna 114 and vehicle height remain unchanged (denoted as "STD" in FIG. 6). Further, when "irritated" is changed to "angry", "angry" is demonstrated in an operation in which the ornament line 108 show a darker red; the eyebrows representing "angry" are lit; the shades of the headlight 110 are half-closed so as to oppose to each other; and front wheels are adjusted to lower the vehicle height.

As described above, by properly controlling the vehicle through anthropomorphizing of its respective devices, expression operations can produce more easily understand expressions.

Relationship between Reaction and Expression Operation Colors

Although the ornament lines 108 and so forth illuminate in red in the above example expression operation, colors for use in expression operations may be selected with reference to psychology in this embodiment because colors selected in consideration of human psychology can help viewers more easily understand the output of the expression operation.

Some reactions may be expressed using warm colors. Specifically, "winking", "fine", "looking around", and so forth, maybe expressed using orange; and "angry", "surprised", "reluctant (not included in FIG. 6)", and so forth, may be expressed using red. Those colors may implicate "active" and "exciting" and exhibit feelings of "joyful", "passionate", "angry", "dangerous", and so forth. Meanwhile, some other reactions such as "sad", "crying", "fearful (not included in FIG. 6)", and so forth, may be expressed using cold colors, which may implicate "inspiration", "aplomb", "sadness", "sophistication", and so forth. "Sleepy" may be expressed in green, showing a state of relief.

Eye Expression Operation (Operations of Headlights, Variable Shades, Eyebrows, and Tears)

As an example expression operation by a smaller part of a vehicle, eye expressions will be described.

Figure 7:
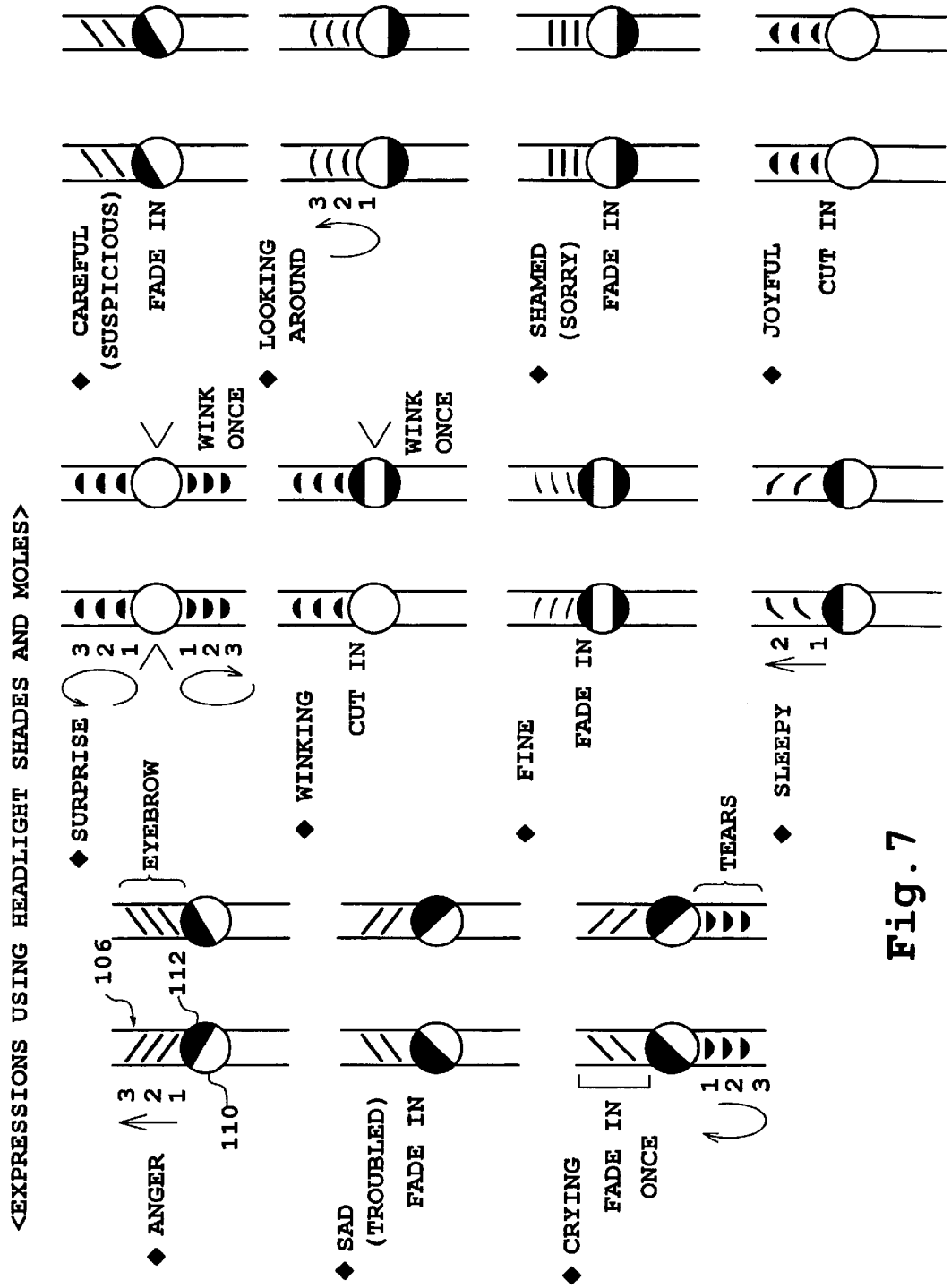
FIG. 7 is a diagram showing an example eye expression operation.

FIG. 7 is a diagram showing example eye expressions. In this drawing, example expression using the headlights 110, variable shades 112, and hood mole bands 106 are shown as example expression operations based on reactions such as "angry", "sad", "crying", and so forth.

In these examples, the eyelids and eyebrows are expressed by means of light emission from parts of the hood mole bands 106 above the headlights 110, while tears are expressed by means of light emission from parts of the hood mole bands 106 below the headlights 110. In the drawing, the arrows (↑) each represents a direction of sequential light emission with the resultant light emitting state being maintained for a predetermined time; the U-shaped marks each represent a direction of sequential light emission with the process of sequential light emitting being repeated a predetermined number of times. Further, the label "cut in" means instant light emission over the entire region; the label "fade in" means gradual light emission over the entire region so that the light may appear as if emerging; and the symbols >< mean variable shades 112 being fully closed, which demonstrates "winking".

As shown in FIG. 7, the variable shades 112 can close and open from top to bottom, bottom to top, and diagonally. The shapes of eyebrows and tears are expressed by means of light emission from the hood mole bands 106 in various shapes such as a line, a half elliptic, and so forth, and the eyebrows and, preferably, tears may be colored appropriately in, for example, orange, red, blue, and green, according to corresponding reactions, such as blue for "crying".

Control Timing

Figure 8:
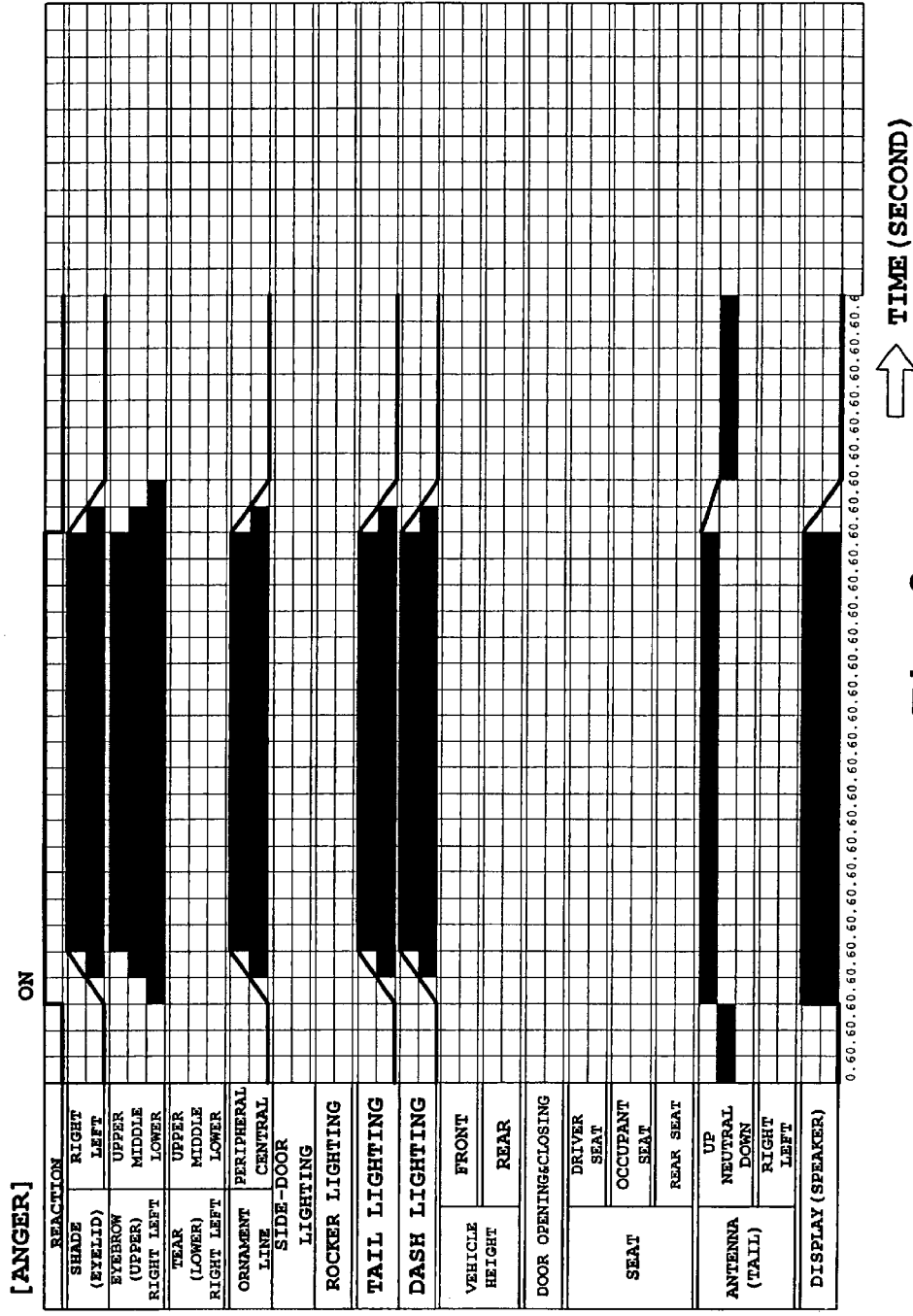
FIG. 8 is a timing chart showing control timing in an expression operation.
Figure 9:
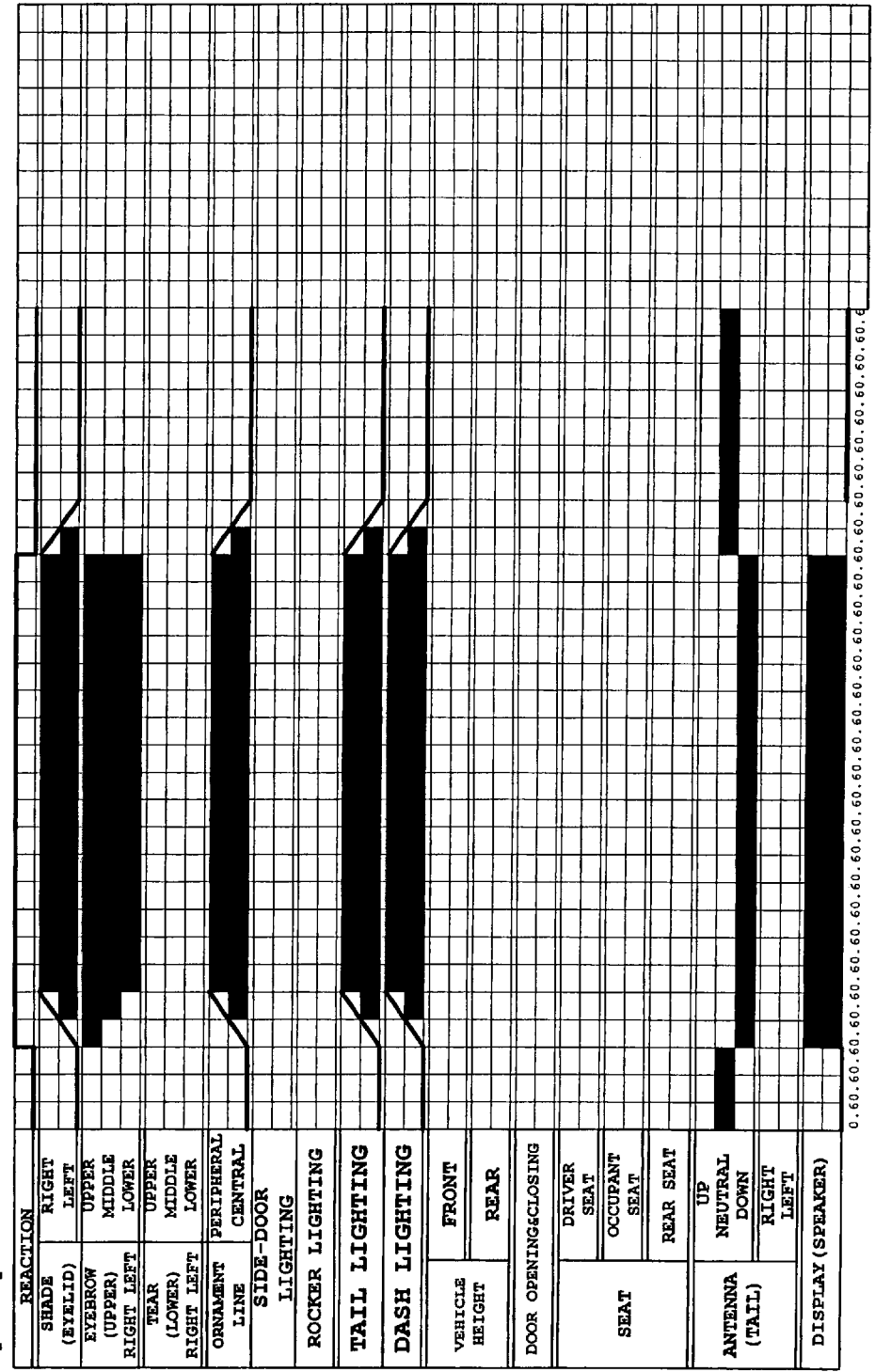
FIG. 9 is a timing chart showing control timing in an expression operation.
Figure 10:
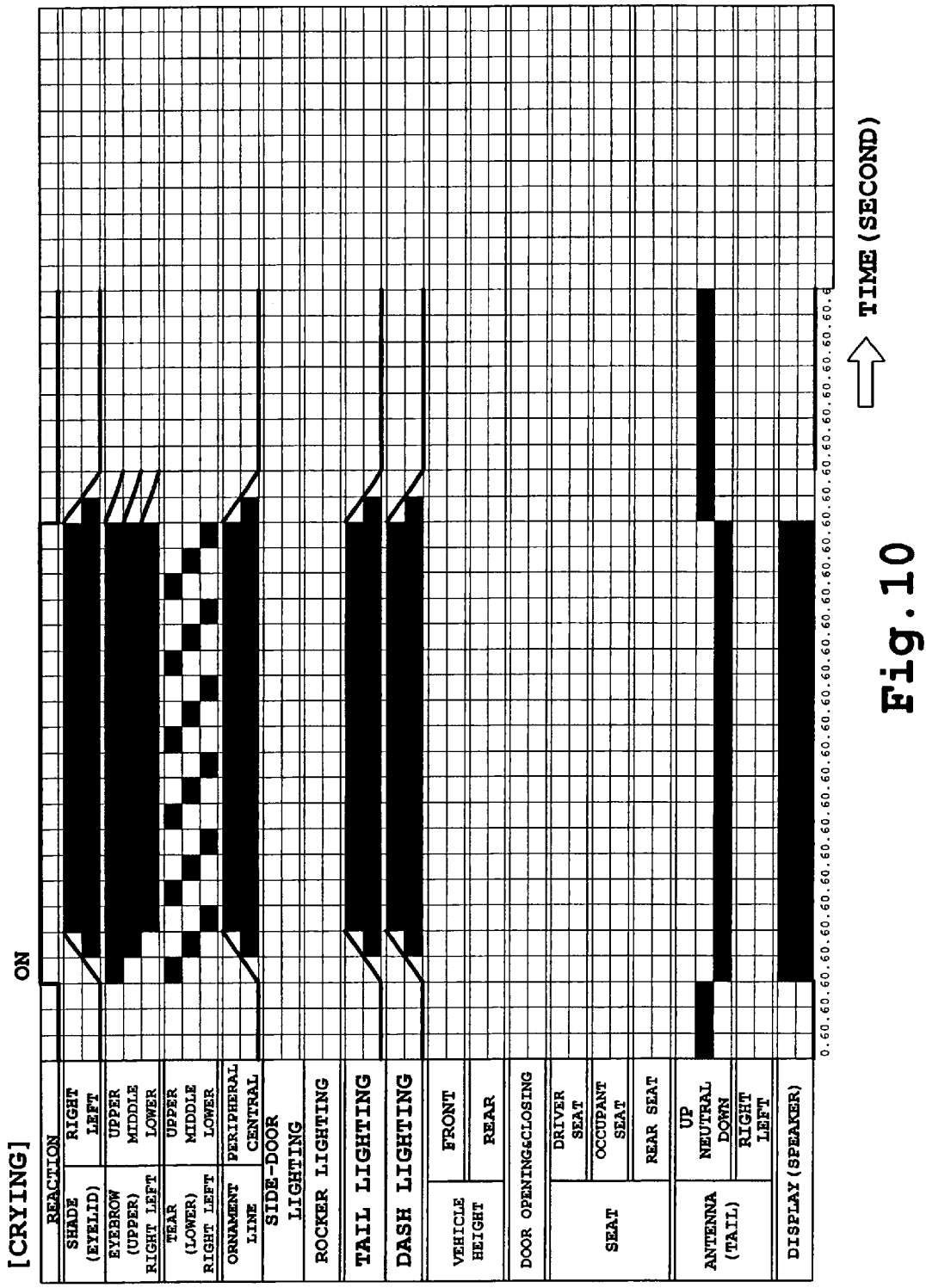
FIG. 10 is a timing chart showing control timing in an expression operation.
Figure 11:
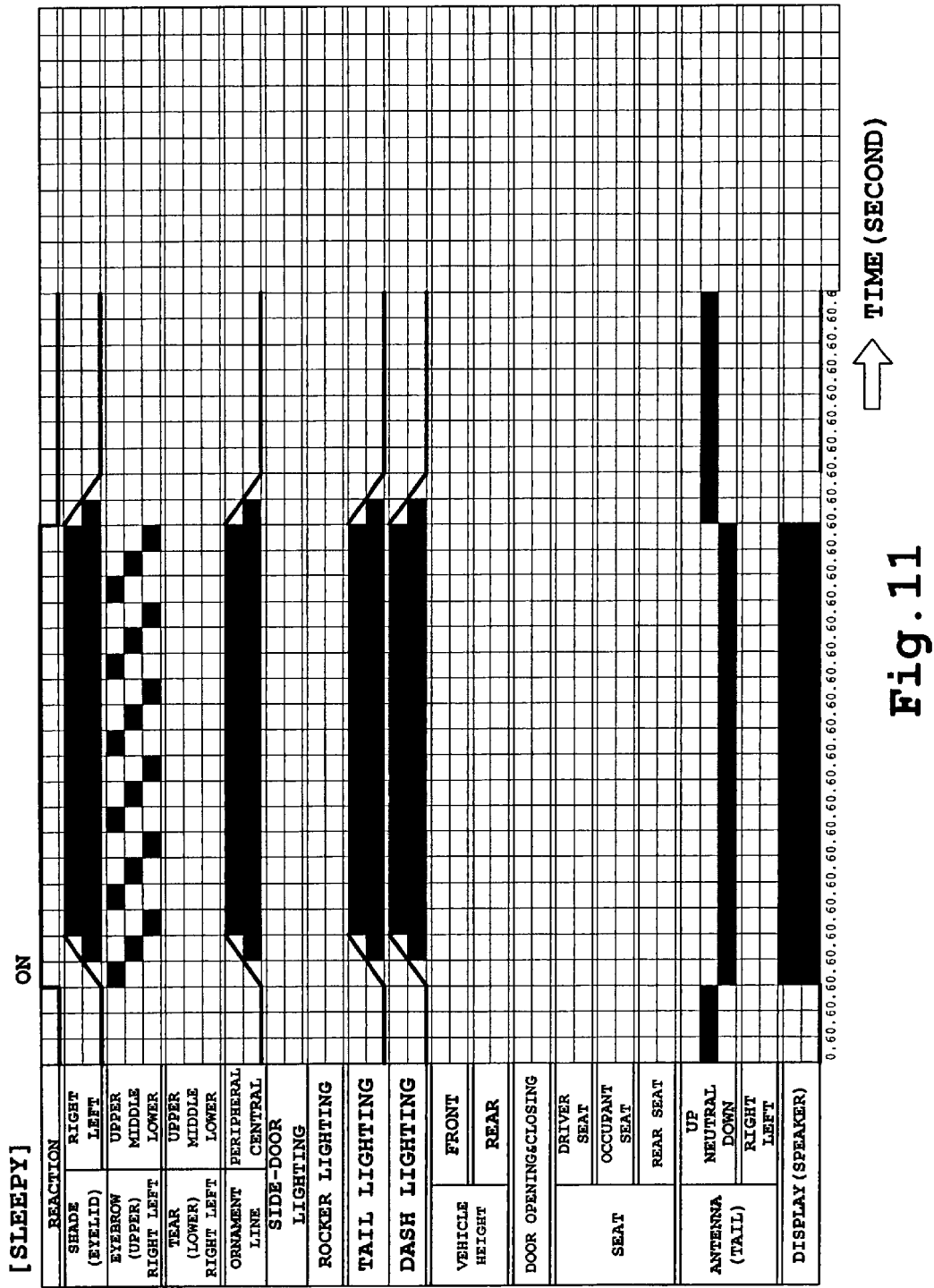
FIG. 11 is a timing chart showing control timing in an expression operation.
Figure 12:
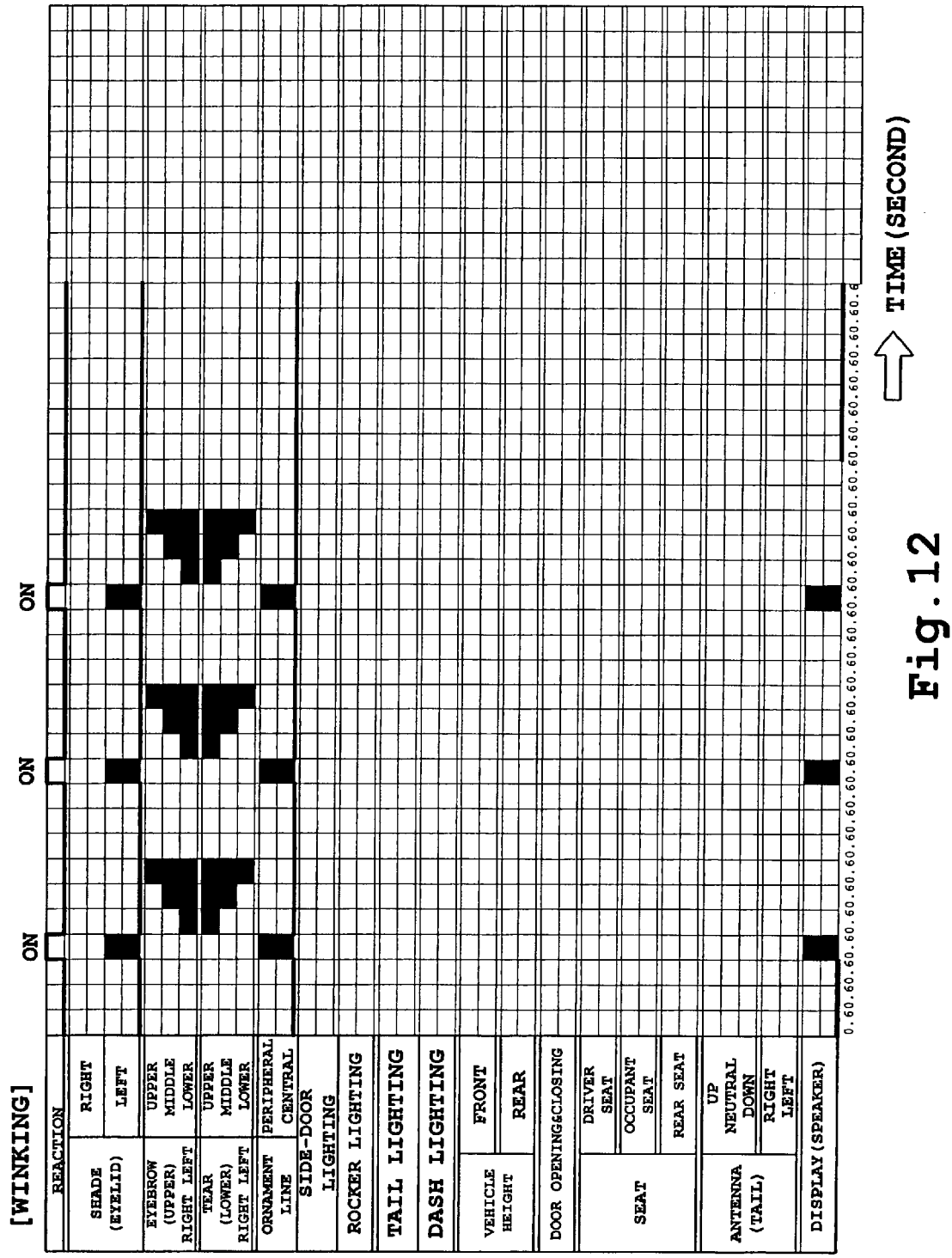
FIG. 12 is a timing chart showing control timing in an expression operation.
Figure 13:
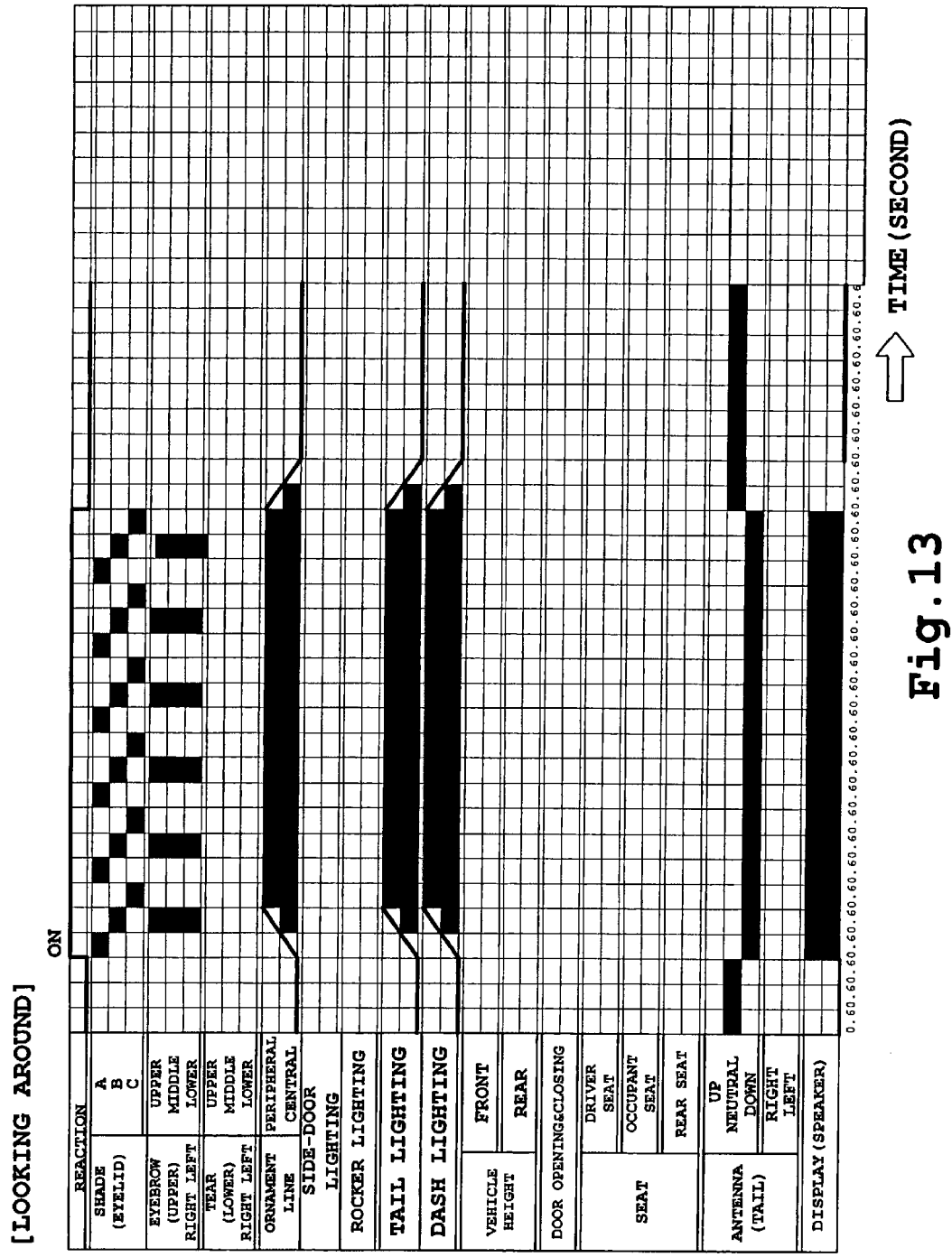
FIG. 13 is a timing chart showing control timing in an expression operation.
Figure 14:
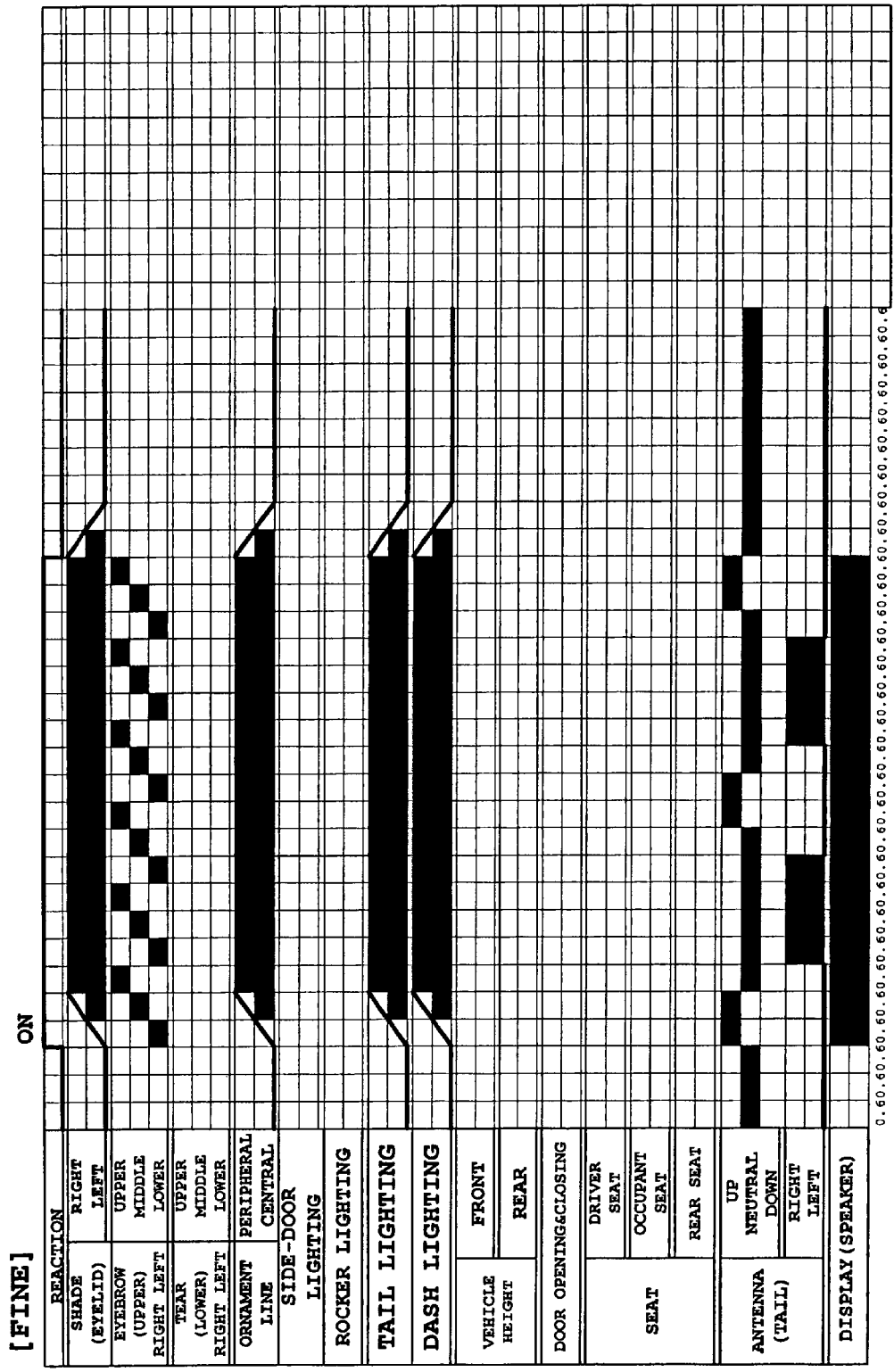
FIG. 14 is a timing chart showing control timing in an expression operation.

FIGS. 8 to 14 are timing charts describing control timing throughout expression operations. FIG. 8 relates to "angry"; FIG. 9 to "sad"; FIG. 10 to "crying"; FIG. 11 to "sleepy"; FIG. 12 to "winking"; FIG. 13 to "looking around"; and FIG. 14 to "fine".

In these drawings, items in columns correspond to the devices equipped to a vehicle, while rows correspond to a lapse of time (seconds), along which timings at which to apply an expression operation are indicated. The term "dash" in the column refers to a vehicular instrument panel which accommodates various meters and switches installed in the front part of the vehicle and the term "rocker refers to a panel provided to and extending in the front-rear direction along each edge of the lower portion of a vehicle. As shown in FIG. 5, LEDs are embedded in the rockers, and so forth.

A point corresponding to turning on of each reaction in the drawing corresponds to formulation of that reaction as a vehicle's current reaction by the reaction formulating section 26, the formulation triggering application of an associated expression operation, and the black portion represents a period during which an associated expression operation is being carried out by, for example, driving the antenna, illuminating the LEDs, and so forth.

Like an antenna, or a tail, which is driven for "angry" in FIG. 8, but not for "winking" in FIG. 12, a device to be controlled is selected for each reaction and control is applied such that respective vehicle devices operate in conjunction as a whole during demonstration of a reaction. This helps ensure that the vehicle's reaction and associated expression operation will be more easily understood by viewers.

As for "angry" in FIG. 8, peripheral and central LEDs are controlled so as to emit light at 0.6 seconds interval to achieve a dynamic expression. The speaker and display in the bottom row of the table correspond to the output section 30 in FIG. 2. For "anger", specifically, the display shows an "angry" expression and the speaker outputs an audio message "I am angry now".

Seat Control

In this embodiment, in addition to formulation of an appropriate reaction, when the occupant approaches or leaves the vehicle, the occupant's seat orientation is controlled.

Figure 15:
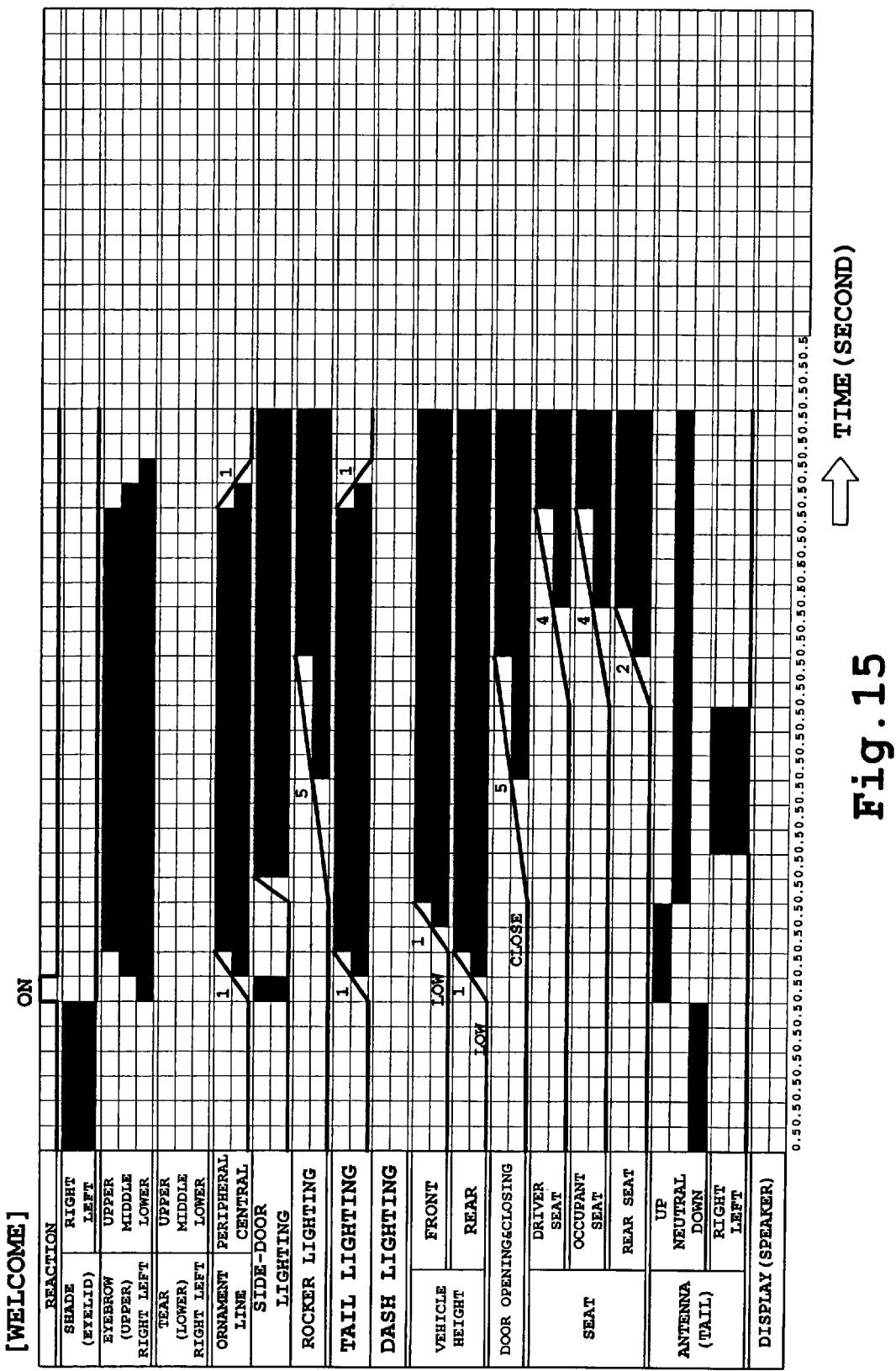
FIG. 15 is a timing chart for showing control timing in a "welcome" mode with a n occupant approaching the vehicle.
Figure 16:
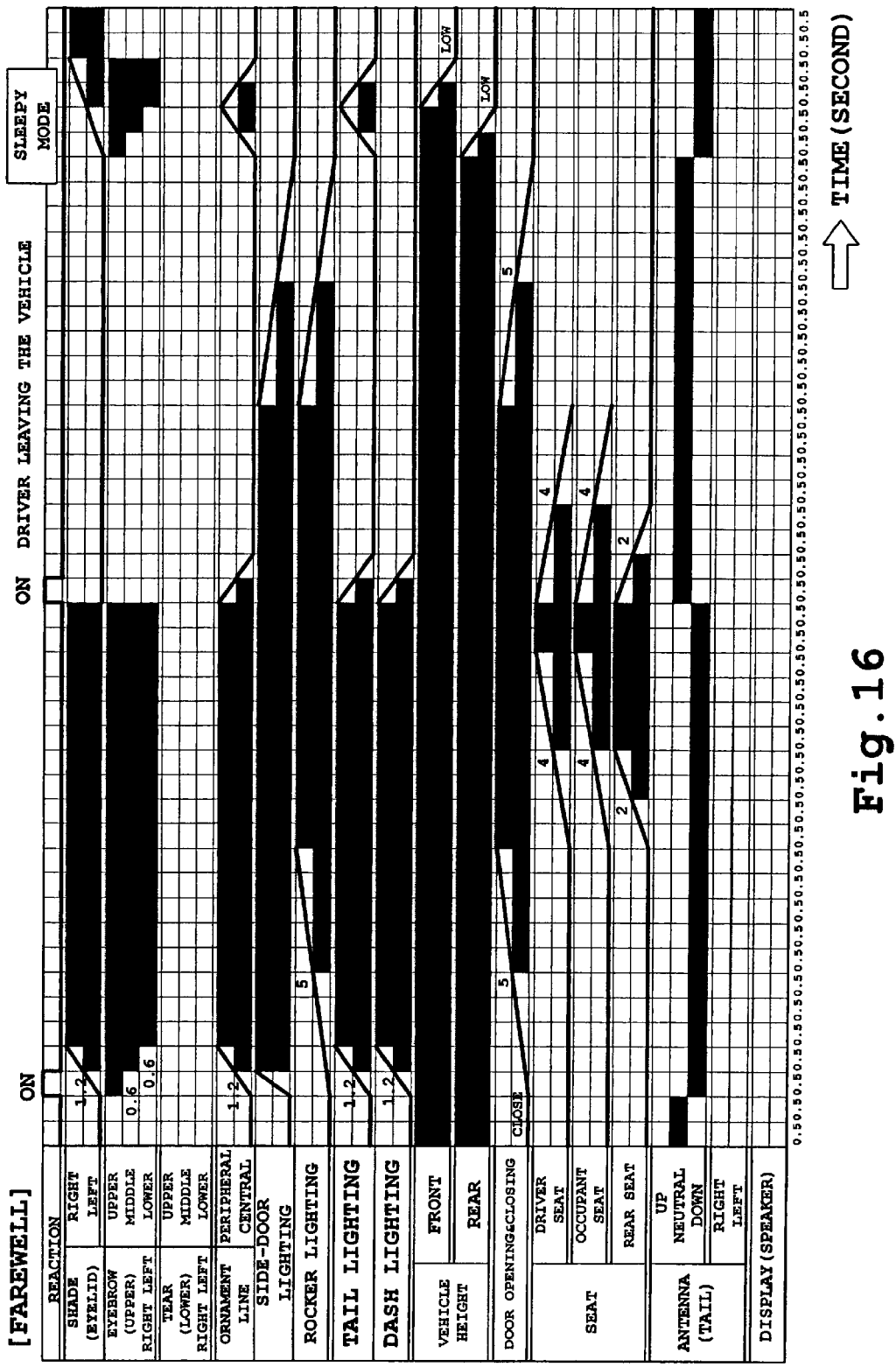
FIG. 16 is a timing chart for showing control timing in a "farewell" mode with an occupant leaving the vehicle.

FIG. 15 is a control timing chart for a "welcome mode", which is performed when it is determined that the occupant is approaching the vehicle. FIG. 16, on the other hand, is a control timing chart for a "farewell mode", which is performed when the occupant is leaving the vehicle. The manner of description in these drawings is similar to those of FIGS. 8 to 14 with respective items in the tables referring to the same items as described above.

As shown in FIG. 15, an occupant's approaching the vehicle leads to formulation of a "welcome" reaction, that is, a reaction similar to a "happy" reaction, and control is applied to the respective devices of the vehicle so as to perform a corresponding expression operation. In addition, in the "welcome" mode, the occupant's seat is also controlled to change its orientation such that it faces the occupant's door to help the occupant more easily sit on the seat. This arrangement can make the occupant feel welcomed by the vehicle, possibly enhancing his affinity for the vehicle. Changing the seat orientation can additionally improve the vehicle's convenience to the occupant.

Referring to FIG. 16, detection of an opened door leads to formulation of a "farewell" reaction, that is, a reaction similar to a "sad" reaction, and control is applied to the respective devices of the vehicle to perform a corresponding expression operation. In the "farewell" mode, similar to the "welcome" mode, the occupant's seat is controlled to change its orientation such that it faces the occupant's door to help the occupant easily stand up. With this expression operation of the respective devices, the occupant may feel the sadness of the vehicle at his or her departure.

As described above, in this embodiment, reaction is formulated based on a situation and condition of the vehicle and other factors, and respective devices of the vehicle are controlled so as to perform an associated expression operation. This arrangement can make the occupants or others feel as if the vehicle has emotion. Further, reaction formulation based on the current status of the reaction of a vehicle can ensure continuity in the expression operations.

Embodiment 2

System Structure

Figure 17:
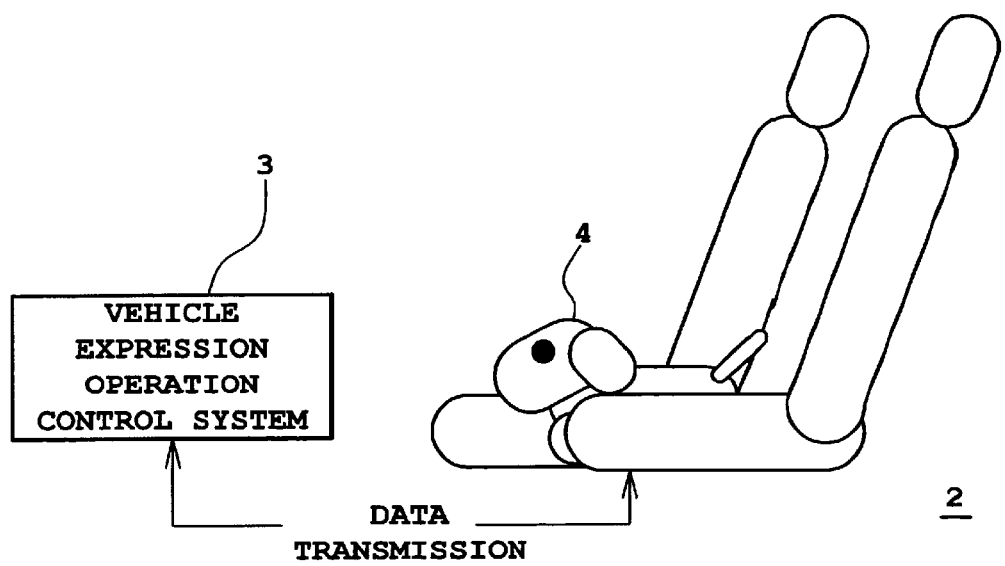
FIG. 17 is a diagram showing a conceptual structure of a vehicle communication system according to a second embodiment of the present invention.
Figure 18:
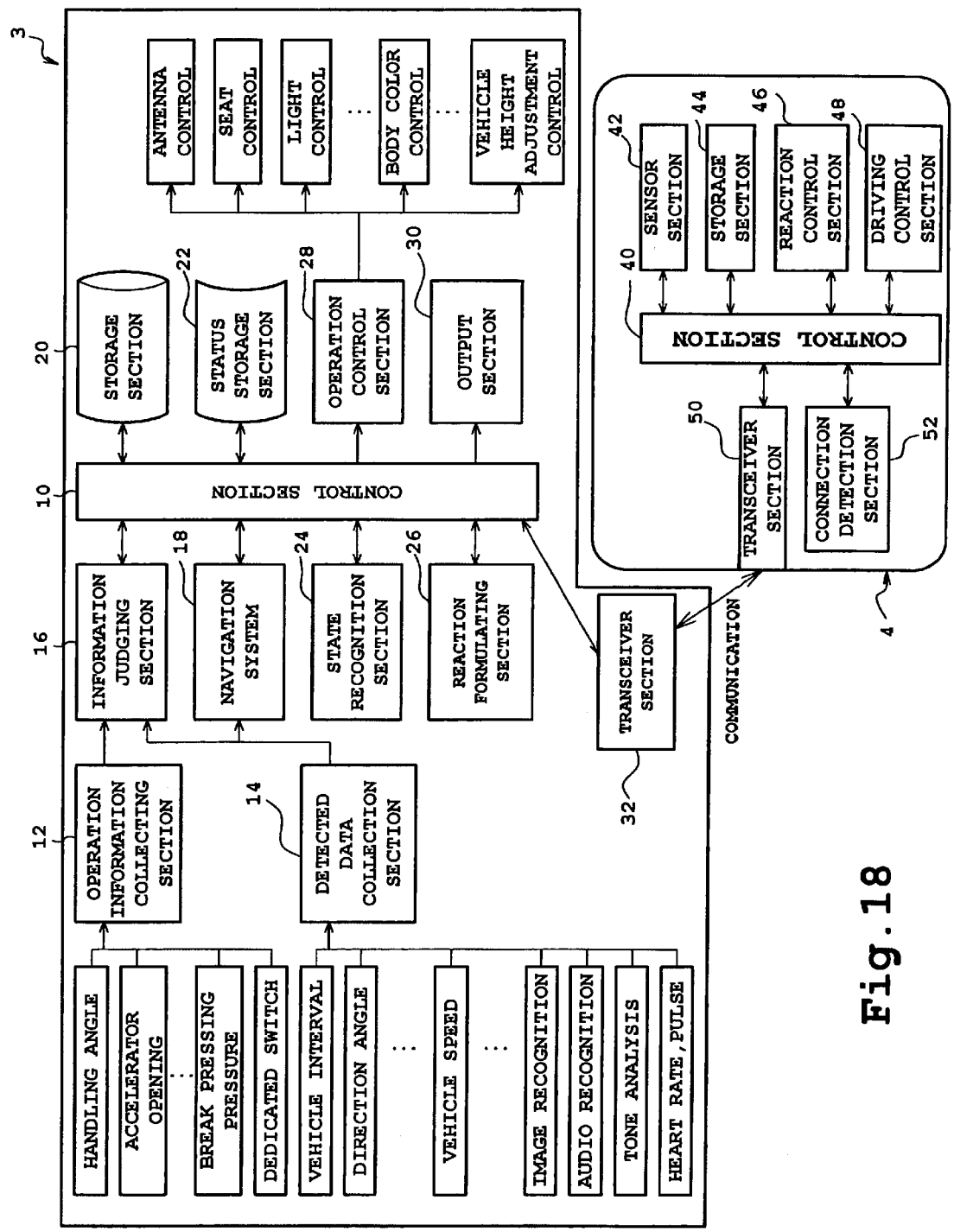
FIG. 18 is a diagram showing the structure of devices constituting a vehicle communication system in the second embodiment.

FIG. 17 is a diagram showing a conceptual structure of a vehicle communication system according to a second preferred embodiment of the present invention. FIG. 18 is a diagram showing a structure of devices constituting the vehicle communication system in the second embodiment.

As shown in FIG. 17, a vehicle communication system 2 is constructed such that a vehicle expression operation control system 3 and an electronic partner 4, which can be taken into a vehicle and remain there with its operator (generally a driver), are connected to each other for mutual data transmission. Data exchange between the vehicle expression operation control system 3 and electronic partner 4 makes it possible to control the system using the electronic partner 4. Further, the vehicle can be controlled as if it communicated with the electronic partner 4. In this embodiment, the electronic partner 4 is a pet robot.

As shown in the upper box in FIG. 18, a basic structure of the vehicle expression operation control system 3 is similar to that of the vehicle expression operation control system 1, described in the first embodiment, wherein identical members are given identical reference numerals and description thereof is not repeated. The only significant difference is in the provision of a transceiver section 32.

The transceiver 32 is used in communication with the pet robot 4, in particular, in sending data from the control section 10 to the pet robot 4 and in receiving a signal from the pet robot 4 to forward to the control section 10. Communication with the pet robot 4 may be made over radio or wire.

The pet robot 4 has a function for determining an appropriate reaction to a situation, and performs an expression operation corresponding to the determined reaction.

Here, an expression operation corresponding to a reaction refers to a process in which the pet robot determines (formulates) a reaction, including emotions "angry", "happy", and so forth, conditions "hungry", "sleepy", and so forth, according to a surrounding situation, and drives its own sections based on the determined reaction to perform an expression operation for demonstration the determined reaction. In this case, a situation where the pet robot exists is determined using sensors or according to commands input by the operator. The pet robot has a learning function for changing and improving its own function for expressing a reaction based on the outside situation, input commands, and so forth.

The pet robot 4 may have a structure as shown in the lower box in FIG. 18, a basic structure of which is similar to that of the vehicle expression operation control system 3. The control section 40 is responsible for various data processing and overall control.

A sensor section 42 senses the outside situation and commands input by the occupant. For example, the sensor section 42 may sense the occupant's stroking (touching) the head or back of the pet robot 4 or the pet robot 4's moving its head up and down or right to left. The sensor section 42 may include sensors, such as an audio sensor for sensing sounds, a contact sensor for sensing contact on the pet robot 4, a CCD device for visually capturing the surrounding situation, and so forth, and an input means, such as switches and buttons. Because the pet robot 4 is taken into a vehicle and remains there with its operator, the sensor section 42 may include a sensor for sensing acceleration and deceleration of the vehicle.

A storage section 44 stores data required by the pet robot 4. The pet robot 4 can determine future operations based on the history of past operations. Any data necessary for learning, such as operation data history, is also stored in the storage section 44. Preferably, an operation program may additionally be stored in the storage section 44.

A reaction control section 46 determines various reactions which the pet robot 4 performs. That is, the reaction control section 46 processes various data from the vehicle expression operation control system 3 to determine an expression operation to be performed by the pet robot 4.

A driving control section 48 controls various actuators in the pet robot 4 to control audio outputs and motions of paws, a tail, and so froth. That is, various motions of the pet robot 4, such as shaking his head, wagging his tail, barking, standing up, moving his ears, and so forth, are all controlled by the driving control section 48.

A transceiver section 50 is used for communication with the transceiver of the vehicle expression operation control system 3. A connection detection section 52 detects the establishment of a connection with the vehicle expression operation control system 3. Preferably, the transceiver section 50 initiates communication with the vehicle expression operation control system 3 upon detection by the connection detection section 52 of the establishment of connection.

Operation of Vehicle Communication System

Operation of the vehicle communication system 2 will be described.

Synchronizing Operation

Figure 19:
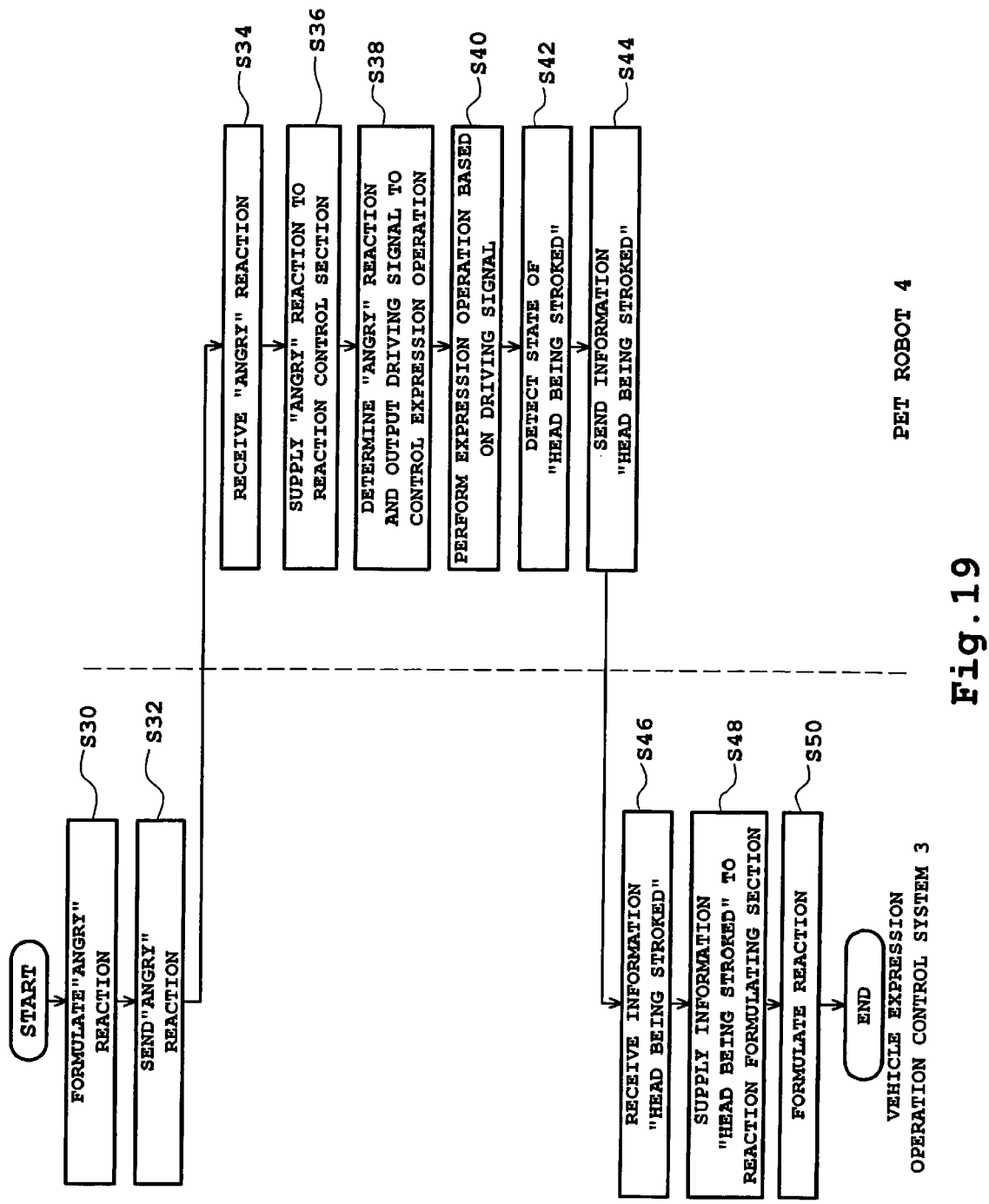
FIG. 19 is a flowchart of a synchronization operation of the vehicle communication system.

FIG. 19 is a flowchart of a synchronizing operation. With reference to this drawing, an operation to be applied when an "angry" reaction is formulated by the vehicle expression operation control system 3 will be described.

When the reaction formulating section 26 of the vehicle expression operation control system 3 formulates an "angry" reaction (S30), the operation control section 28 controls the respective devices to perform corresponding expression operations. The transceiver 32 sends information indicating that an "angry" reaction is formulated by the reaction formulating section 26 to the transceiver section 50 of the pet robot 4 (S32), and the transceiver section 50 of the pet robot 4 receives the information (S34). The "angry" reaction received by the transceiver section 50 is forwarded via the control section 40 to the reaction control section 46 (S36). Referring to reaction data stored in the storage section 44, the reaction control section 46 determines an "angry" reaction as the pet robot's reaction and sends a driving signal to the control section 40 to control so as to perform an expression operation (throwing a tantrum or the like) based on the "angry" reaction (S38). The control section 40 supplies a driving signal to the driving control section 48, which in turn outputs audio input and driving commands to the respective sections responsible for predetermined operations. In response to the audio output and driving commands, the respective sections perform an expression operation for "angry" by, for example, throwing a tantrum (S40).

As described above, when the vehicle's reaction is transmitted, the pet robot 4 determines the same reaction as that of the vehicle's and performs an expression operation based on that reaction. This makes it possible for the occupant to recognize the vehicle's reaction by watching the pet robot 4.

Recognizing the pet robot 4's expression operation "angry", the occupant may stroke the head of the pet robot 4 to console it. This is sensed by the sensor section 42 of the pet robot 4 (S42). The information sensed by the sensor section 42, telling that the head of the pet robot 4 is stroked, is supplied via the control section 40 to the transceiver section 50. The transceiver section 50 forwards the information to the transceiver 32 of the vehicle expression operation control system 3 (S44), so that the transceiver 32 receives the information (S46). The command input "stroking the head", given to the pet robot 4 and received by the transceiver 32, is supplied to the reaction formulating section 26 (S48). The reaction formulating section 26 in turn formulates a reaction based on the command input "stroking the head" (S50) and performs an expression operation based on the reaction by, for example, formulating a reaction "anger quelled" just as if the command input "stroking the head" were give to the vehicle, which is actually given to the pet robot 4.

As described above, whereas verbal consolation is the sole applicable method in the vehicle expression operation control system in the first embodiment, other options, such as stroking a head and speaking to the pet robot 4, can be similarly applied in addition to verbal consolation in this embodiment. This allows the occupant to employ a variety of means of communication.

Collaboration Operation

Figure 20:
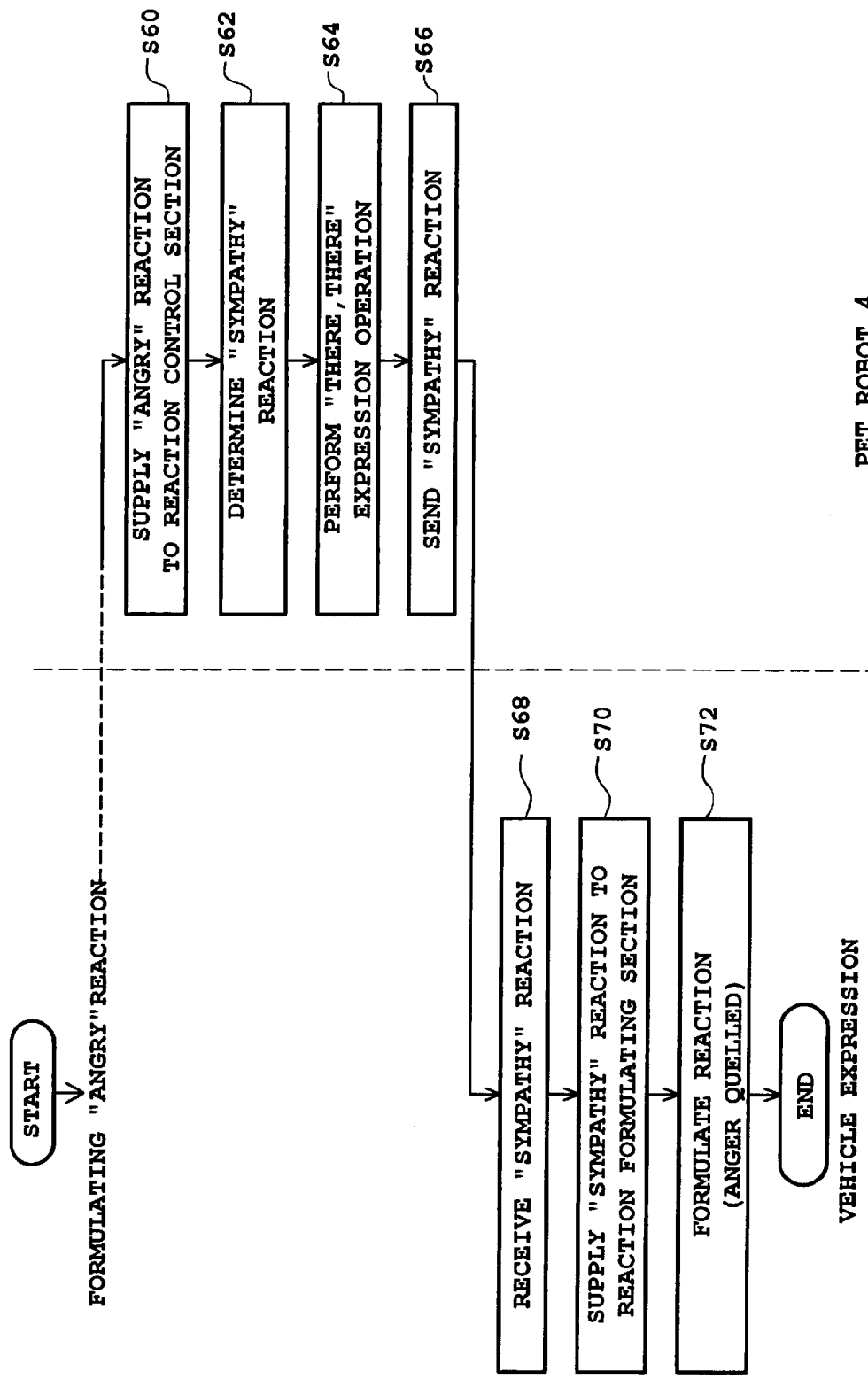
FIG. 20 is a flowchart of a collaboration operation of the vehicle communication system.

FIG. 20 is a flowchart showing a collaboration operation. Referring to FIG. 20, an operation to be performed when an "angry" reaction is formulated by the vehicle expression operation control system 3 will be described.

When an "angry" reaction is formulated in the reaction formulating section 26 of the vehicle expression operation control system 3, the vehicle's "angry" reaction is supplied to the reaction control section 46, as described above (S60). The reaction control section 46, referring to reaction data and operation data history stored in the storage section 44, formulates "sympathy" with respect to the vehicle's "angry" reaction and controls to perform a consoling expression operation such as "there, there" for consolation (S62) As a result, the pet robot 4 performs an expression operation such as "there, there" for appeasing (S64).

The reaction "sympathy" of the pet robot 4 is supplied via the control section 40 to the transceiver section 50, which forwards it to the transceiver 32 of the vehicle expression operation control system 3 (S66), so that the transceiver 32 receives it (S68). The reaction "sympathy" of the pet robot 4, received by the transceiver 32, is then supplied via the control section 10 to the reaction formulating section 26 (S70). The reaction formulating section 26 formulates a reaction based on the reaction "sympathy" (S72) and performs an expression operation accordingly. Specifically, based on the pet robot 4's "sympathy", the reaction formulating section 26 formulates a reaction "anger quelled".

As described above, without any action, the occupant can understand the exchange of communication between the pet robot 4 and the vehicle under control of the vehicle expression operation control system 3, and can thus feel affinity to the vehicle and the pet robot.

The pet robot 4 can also show its "sympathy" for the vehicle's "sad" reaction by, for example, nodding; the pet robot 4 can sing to create a "joyful" atmosphere when the vehicle appears "sleepy"; or the pet robot 4 could even "bark fiercely" to wake up the "sleepy" vehicle.

Embodiment 3

Figure 21:
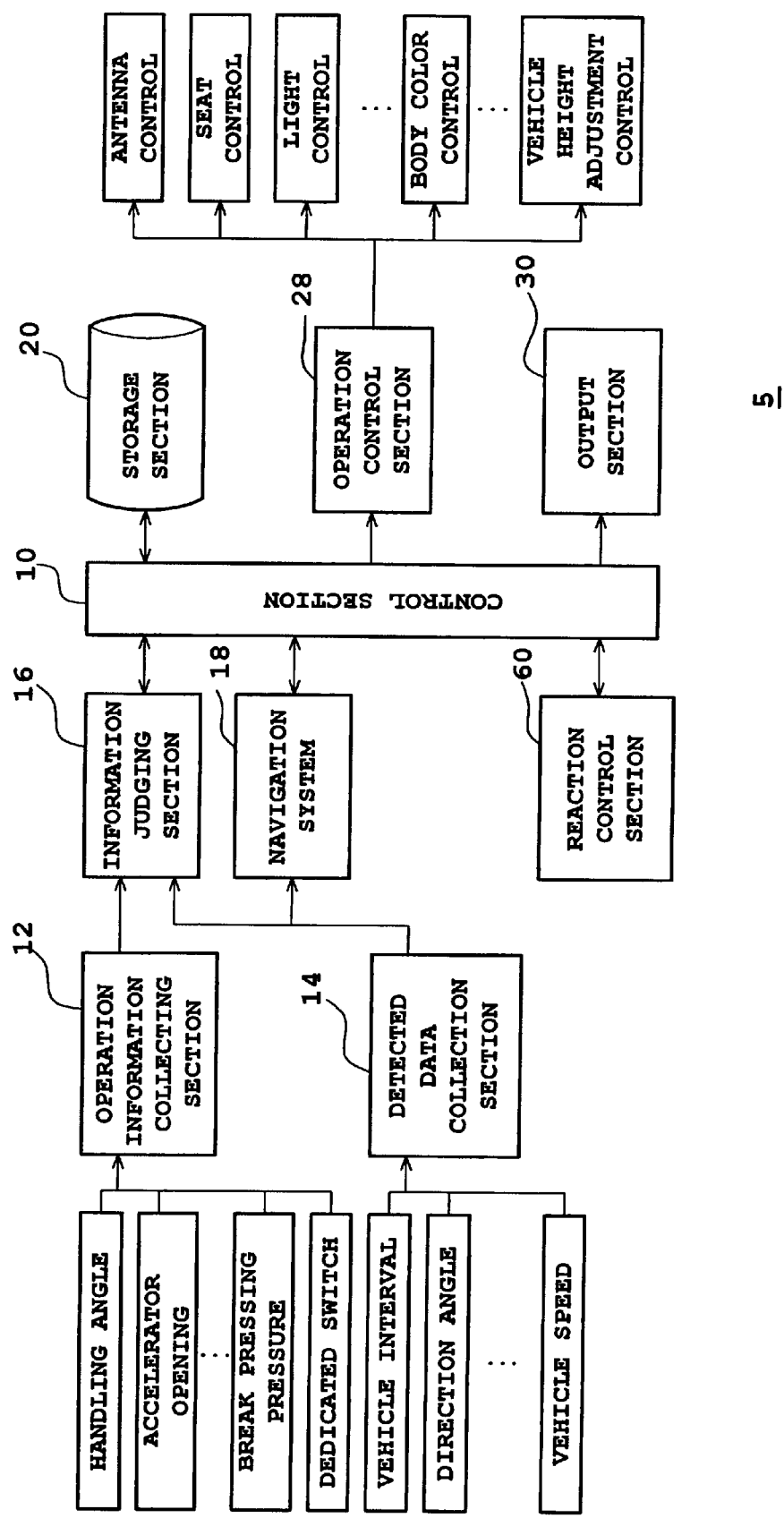
FIG. 21 is a diagram showing the structure of devices constituting an expression control system according to a third embodiment of the present invention.

FIG. 21 is a diagram showing a structure of devices constituting a vehicle expression operation control system 5 according to a third embodiment of the present invention.

A basic structure of the vehicle expression operation control system 5 of the third embodiment is identical to that of the vehicle expression operation control system 1 in the first embodiment, in which identical components are given identical reference numerals and their descriptions are not repeated. However, a reaction control section 60 in this embodiment differs from the reaction formulating section 26 of the first embodiment.

With reference to reaction data stored in the storage section 20, the reaction control section 60 determines various reactions based on the condition/situation of a vehicle. Specifically, through processing of information concerning the state of operation of the devices equipped to the vehicle, supplied from the operation information collecting section 12, and information concerning the state of operation of the vehicle, supplied from the detected data collection section 14, the reaction control section 60 determines a vehicle expression operation.

In this embodiment, differing from the first embodiment, a reaction is not determined based on the status information and/or condition of a vehicle. Rather, substantially a one-to-one relationship between each possible vehicle condition, and a corresponding reaction is predetermined so that, upon detection of a certain vehicle condition, a reaction is accordingly determined, if stored in the vehicle storage section 20, and so forth, and a corresponding expression operation is duly performed. For example, detection of "sudden handling" leads to determination of an "angry" reaction, and in turn, to performance of a corresponding expression operation.

This arrangement makes it possible for a vehicle to perform various expression operations based on its own condition such that viewers outside of the vehicle can understand the vehicle's condition from its expression.

Embodiment 4

Figure 22:
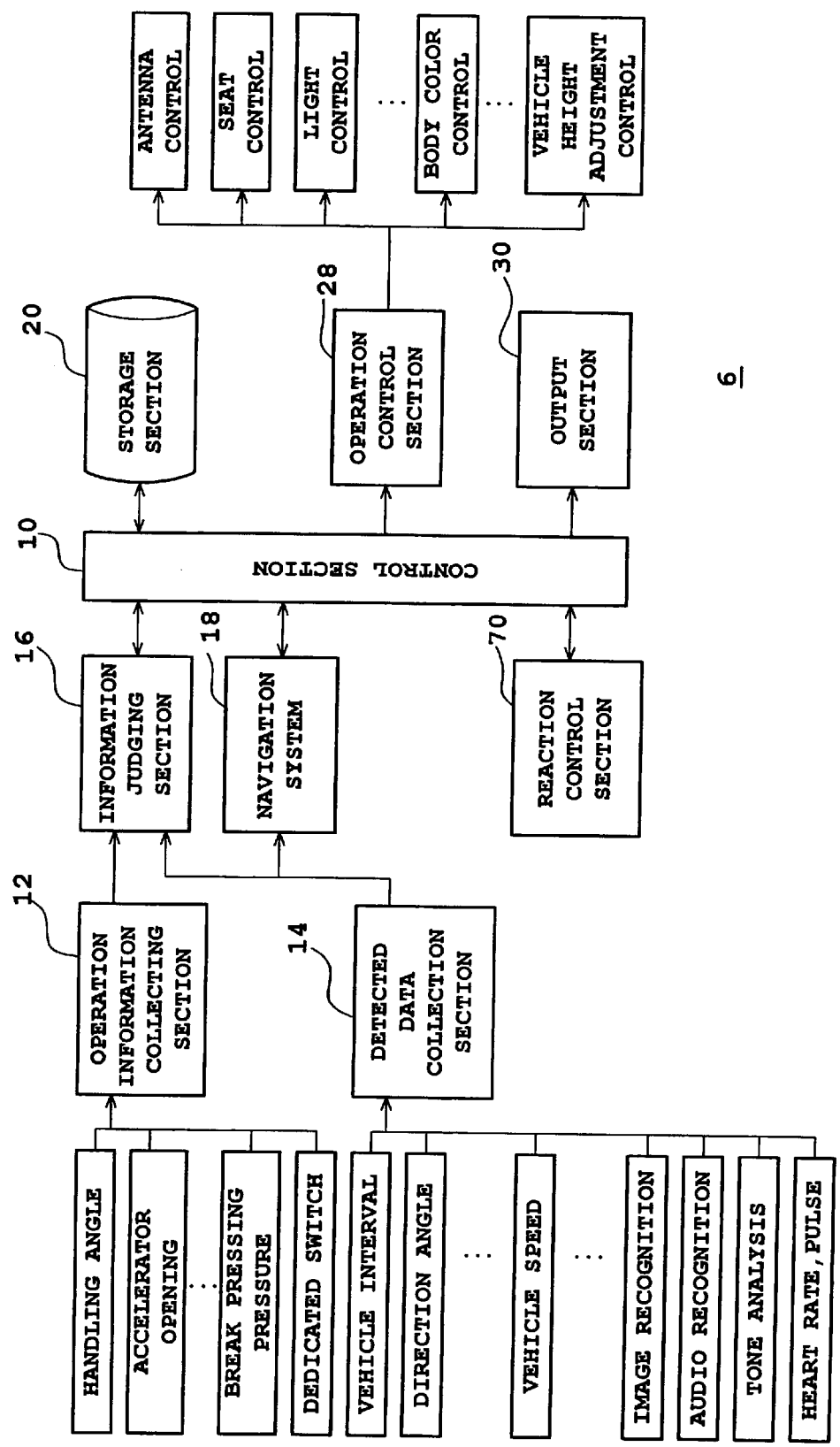
FIG. 22 is a diagram showing the structure of devices constituting an expression control system according to the third embodiment.

FIG. 22 is a diagram showing a structure of a vehicle expression operation control system 6 according to a fourth embodiment of the present invention.

The basic structure of the vehicle expression control system 6 according to this embodiment is identical to that of the vehicle expression operation control system 1 in the first embodiment, and identical numbers indicate identical components for which the description will not be repeated.

In this embodiment, with reference to reaction data stored in the storage section 20, the reaction control section 70 determines various reactions based on the occupant's condition and determines an expression operation to be performed by the vehicle.

The occupant's condition is determined by an image recognizing device and various sensors connected to the detected data collection section 14, which detect or measure, for example, the occupant's countenance, commands directed to the vehicle, tones of the voice (such as, an angry tone), heart rates, pulses, and so forth. Also, occupants may input commands using a dedicated switch connected to the operation information collecting section 12.

For example, an occupant's winking may be recognized by an image recognizing device and so forth and the reaction control section 70 may determine a reaction "winking" and control the vehicle so as to perform an expression operation "winking". For another example, when a high heart rate of, for example, a beginner occupant is detected, the reaction control section 70 may determine a "tense" reaction and control so as to perform a corresponding expression operation.

With this arrangement, an occupant's subtle intent, which is difficult to be accurately conveyed to others using horn, such as whether or not he wishes to go first or wait at a crossing without a signal, can be conveyed to other vehicles. Therefore, a communication range between occupants in different vehicles can become larger than with conventional communication using only a horn.

Further, an occupant's characteristics, such as the occupant being a beginner occupant, can be informed to other vehicles' occupants through the vehicle's expression operation. This may cause, for example, the other vehicles' occupants to maintain a larger interval, which results in improved occupant condition. Still further, because the headlight illumination can be changed to direct, for example, rightward when the occupant looks to the right, the vehicle's drivability can be improved.

It should be noted that, whereas a vehicle's reaction is determined based on (linked with) information concerning an occupant in the example of this embodiment, it may be similarly preferable that a reaction is determined based on information concerning the pet robot described in the second embodiment. This may be preferably realized using a structure in which the vehicle expression operation control system and the pet robot are provided with a transceiver section for data exchange, similar to the system structure in the second embodiment, so that information concerning the pet robot can be provided to the vehicle expression operation control system.

ADVANTAGE OF THE INVENTION

As described above, according to the present invention, vehicles can perform various expression operations based on conditions and so forth of the vehicle or occupants such that viewers, such as occupants of other vehicles, can recognize the condition of the vehicle or its occupants by watching the vehicle's expression.

The invention has been described with reference to example preferred embodiments. Obviously, modifications and alterations will occur to others upon a reading and understanding of this specification. All such modifications and alterations that lie within the scope of the appended claims or the equivalents thereof are to be included in the scope of the invention.

What is claimed is:

1. A vehicle expression operation control system for controlling an expression operation of a vehicle, comprising:
    a vehicle condition detecting device for detecting condition of the vehicle, including a state of operation of the vehicle or a state of operation of a device equipped to the vehicle; and
    a reaction control device for determining a reaction of the vehicle based on the condition of the vehicle detected by the vehicle condition detecting device to control performance of an expression operation corresponding to the reaction determined, wherein the expression operation corresponds to an expression timing chart to produce a controlled expression state of a plurality of expression states for a controlled time interval.

2. The vehicle communication system according to claim 1, further comprising an output device installed in the vehicle, for outputting information on the reaction or expression operation of the vehicle.

3. A vehicle expression operation control system for controlling an expression operation of a vehicle, comprising:
    an occupant condition detecting device for detecting condition of an occupant of the vehicle, including condition of the occupant and a command input by the occupant; and
    a reaction control device for determining a reaction of the vehicle based on the condition of the occupant of the vehicle detected by the occupant condition detecting device to control performance of an expression operation corresponding to the reaction determined, wherein the expression operation corresponds to an expression timing chart to produce a controlled expression state of a plurality of expression states for a controlled time interval.

4. The vehicle communication system according to claim 3, further comprising an output device installed in the vehicle, for outputting information on the reaction or expression operation of the vehicle.

5. A vehicle expression operation control system for controlling an expression operation of a vehicle, comprising:
    an electronic partner condition detecting device for detecting condition of an electronic partner or a command input given to the electronic partner by an occupant of the vehicle, the electronic partner being placed in the vehicle by the occupant and performing a predetermined motion based on its function for expressing a reaction according to detected external conditions or in response to a command input; and
    a reaction control device for determining a reaction of the vehicle based on the condition of the electronic partner detected by the electronic partner condition detecting device to control performance of an expression operation corresponding to the reaction determined, wherein the expression operation corresponds to an expression timing chart to produce a controlled expression state of a plurality of expression states for a controlled time interval.

6. The vehicle communication system according to claim 5, further comprising an output device installed in the vehicle, for outputting information on the reaction or expression operation of the vehicle.

7. A vehicle expression operation control system for formulating a reaction of a vehicle and controlling performance of an expression operation corresponding to the reaction formulated, comprising:
    current status recognition means for recognizing current status of a state, including a reaction, of the vehicle;
    vehicle condition detecting means for detecting condition of the vehicle, including a state of operation of the vehicle or a state of operation of a device equipped to the vehicle;
    reaction formulating means for formulating a reaction based on the current status of the vehicle recognized by the current status recognition means and according to the condition of the vehicle detected by the vehicle condition detecting means; and
    reaction control means for controlling performance of an expression operation corresponding to the reaction formulated by the reaction formulating means, wherein the expression operation corresponds to an expression timing chart to produce a controlled expression state of a plurality of expression states for a controlled time interval.

8. A vehicle expression operation control system according to claim 7, further comprising:

occupant condition detecting means for detecting condition of an occupant of the vehicle, including condition of the occupant and a command input by the occupant; wherein the reaction formulating means formulates a reaction based on the current status of the vehicle recognized by the current status recognition means and according to the condition of the occupant detected by the occupant condition detecting means.

9. A vehicle communication system comprising the vehicle expression operation control system according to claim 7 and an electronic partner placed in the vehicle by an occupant of the vehicle, for performing a predetermined motion based on its function for expressing a reaction according to a state of outside situation or in response to a command input, wherein
the vehicle expression operation control system and the electronic partner are able to transmit and receive data between each other.

10. The vehicle communication system according to claim 9, wherein the electronic partner obtains information on the reaction of the vehicle from the vehicle expression operation control system and performs a predetermined motion based on the information obtained.

11. The vehicle communication system according to claim 10, wherein the reaction of the electronic partner is identical to the reaction of the vehicle.

12. The vehicle communication system according to claim 9, wherein the vehicle expression operation control system obtains a command input to the electronic partner or information concerning an outside situation; and the reaction formulating means of the vehicle expression operation control system formulates a reaction of the vehicle based on the command input to the electronic partner or the information concerning an outside situation.

13. The vehicle communication system according to claim 9, wherein the vehicle expression operation control system obtains information on the reaction of the electronic partner; and the reaction formulating means of the vehicle expression operation control system formulates the reaction of the vehicle based on the reaction of the electronic partner.

14. The vehicle communication system according to claim 9, further comprising an output device installed in the vehicle, for outputting information on the reaction or expression operation of the vehicle.

15. The vehicle communication system according to claim 7, further comprising an output device installed in the vehicle, for outputting information on the reaction or expression operation of the vehicle.

16. A vehicle expression operation control system for formulating a reaction of a vehicle and controlling performance of an expression operation corresponding to the reaction formulated, comprising:

current status recognition means for recognizing current status of a state, including a reaction, of the vehicle;

occupant condition detecting means for detecting condition of an occupant of the vehicle, including condition of the occupant and a command input by the occupant;

reaction formulating means for formulating a reaction based on the current status of the vehicle recognized by the current status recognition means and according to the condition of the occupant detected by the occupant condition detecting means; and reaction control means for controlling performance of an expression operation corresponding to the reaction formulated by the reaction formulating means, wherein the expression operation corresponds to an expression timing chart to produce a controlled expression state of a plurality of expression states for a controlled time interval.

17. A vehicle communication system comprising the vehicle expression operation control system according to claim 16 and an electronic partner placed in the vehicle by an occupant of the vehicle, for performing a predetermined motion based on its function for expressing a reaction according to a state of outside situation or in response to a command input, wherein
the vehicle expression operation control system and the electronic partner are able to transmit and receive data between each other.

18. The vehicle communication system according to claim 16, further comprising an output device installed in the vehicle, for outputting information on the reaction or expression operation of the vehicle.

19. A vehicle for performing an expression operation by changing an external appearance of devices equipped to the vehicle based on a condition detected by a condition detecting device, wherein the expression operation corresponds to an expression timing chart to produce a controlled expression state of a plurality of expression states for a controlled time interval.

20. The vehicle for performing an expression operation according to claim 19, further comprising an expression operation assisting member for assisting an expression operation of the devices equipped to the vehicle.

* * * * *